United States Patent
Kojima

(10) Patent No.: US 11,431,033 B2
(45) Date of Patent: Aug. 30, 2022

(54) METHOD FOR PRODUCING ALL-SOLID-STATE BATTERY

(71) Applicant: TOYOTA JIDOSHA KABUSHIKI KAISHA, Toyota (JP)

(72) Inventor: Shinji Kojima, Nagoya (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 16/659,665

(22) Filed: Oct. 22, 2019

(65) Prior Publication Data
US 2020/0136191 A1  Apr. 30, 2020

(30) Foreign Application Priority Data
Oct. 25, 2018 (JP) .............................. JP2018-200907

(51) Int. Cl.
| | | |
|---|---|---|
| *H01M 10/0585* | (2010.01) | |
| *H01M 10/0562* | (2010.01) | |
| *H01M 10/04* | (2006.01) | |
| *H01M 4/04* | (2006.01) | |

(52) U.S. Cl.
CPC ... *H01M 10/0585* (2013.01); *H01M 10/0436* (2013.01); *H01M 10/0562* (2013.01); *H01M 4/04* (2013.01)

(58) Field of Classification Search
None
See application file for complete search history.

(56) References Cited

U.S. PATENT DOCUMENTS

| | | | | |
|---|---|---|---|---|
| 10,147,968 | B2* | 12/2018 | Visco | C03B 23/245 |
| 2006/0141320 | A1* | 6/2006 | Sato | H01M 4/8657 |
| | | | | 429/412 |
| 2015/0349373 | A1* | 12/2015 | Snyder | H01M 4/70 |
| | | | | 429/162 |
| 2016/0190640 | A1* | 6/2016 | Visco | H01M 10/0562 |
| | | | | 429/322 |
| 2016/0329602 | A1* | 11/2016 | Kojima | H01M 10/0562 |
| 2018/0248201 | A1* | 8/2018 | Shimoda | H01M 4/0407 |
| 2018/0301753 | A1* | 10/2018 | Ose | H01M 10/0562 |

FOREIGN PATENT DOCUMENTS

| | | |
|---|---|---|
| JP | 2014-127260 A | 7/2014 |
| JP | 2015-103432 A | 6/2015 |

* cited by examiner

*Primary Examiner* — Jonathan Crepeau
*Assistant Examiner* — Angela J Martin
(74) *Attorney, Agent, or Firm* — Sughrue Mion, PLLC

(57) ABSTRACT

To provide a method for producing an all-solid-state battery which is configured to suppress chipping of a cut end, shedding of the constituent materials, etc., and which is configured to suppress removal of the solid electrolyte layer. The method is a method for producing an all-solid-state battery, comprising: preparing a first laminate by laminating a first solid electrolyte layer on a first active material layer, forming a solid electrolyte removed part by removing a part of the first solid electrolyte layer on the first active material layer, and cutting the first laminate by applying laser light, in a laminating direction of the first laminate, to the solid electrolyte removed part.

8 Claims, 11 Drawing Sheets

METHOD FOR PRODUCING ALL-SOLID-STATE BATTERY

TECHNICAL FIELD

The disclosure relates to a method for producing an all-solid-state battery.

BACKGROUND

In recent years, there is an increasing demand for a laminated battery comprising a battery structure member (an electrode sheet) for all-solid-state batteries, the battery component comprising a cathode or anode layer and a solid electrolyte layer. Also, there is a demand for a method for efficiently producing a large number of laminated batteries in a short time.

For example, Patent Literature 1 discloses a method for manufacturing a solid electrolyte battery, the method comprising manufacturing a laminate in which at least a cathode, a solid electrolyte and an anode are disposed between first and second collector foils, and cutting the laminate by the engagement of two cutting blades disposed on the cathode and anode sides to obtain a battery structure.

However, when a laminate comprising a cathode or anode layer and a solid electrolyte layer, or a stack of the laminates, is cut by cutting blades as disclosed in Patent Literature 1, there is a problem in that shedding of the constituent materials or chipping is likely to occur at the end of a cut part thus formed (hereinafter, it will be referred to as "cut end").

In Patent Literature 2, it is disclosed that cutting with blades, polishing, a laser or ultrasonic cutting process, etc., are adoptable as the method for cutting a laminate comprising a cathode layer, a solid electrolyte layer and an anode layer.

Patent Literature 1: Japanese Patent Application Laid-Open (JP-A) No. 2014-127260

Patent Literature 2: JP-A No. 2015-103432

As described above, when the laminate comprising the cathode or anode layer and the solid electrolyte layer, or the stack of the laminates is cut by laser application, heat is generated by the laser application. Due to the heat, the constituent materials of the cathode or anode layer are melted, and the melted materials solidify at the cut end. Accordingly, there is an advantage in that generation of problems as described above (e.g., chipping of the cut end and shedding of the constituent materials) is suppressed.

Meanwhile, as described above, when the laminate comprising the cathode or anode layer and the solid electrolyte layer, or the stack of the laminates, is cut by laser light, there is a problem in that removal of a part of the solid electrolyte layer is likely to occur.

SUMMARY

In light of the above circumstance, an object of the disclosed embodiments is to provide a method for producing an all-solid-state battery which is configured to suppress chipping of the cut end, shedding of the constituent materials, etc., and which is configured to suppress removal of the solid electrolyte layer.

In a first embodiment, there is provided a method for producing an all-solid-state battery, the method comprising: preparing a first laminate by laminating a first solid electrolyte layer on a first active material layer, forming a solid electrolyte removed part by removing a part of the first solid electrolyte layer on the first active material layer, and cutting the first laminate by applying laser light, in a laminating direction of the first laminate, to the solid electrolyte removed part.

The method may further comprise, before the cutting, preparing a second laminate by laminating a counter electrode-side active material layer on one side of the first solid electrolyte layer, which is opposite to the side on which the first active material layer is laminated, and wherein the cutting is cutting the second laminate by applying laser light, in a laminating direction of the second laminate, to the solid electrolyte removed part.

In the method, a third laminate in which the first solid electrolyte layer, the first active material layer, an electrode current collector, a second active material layer and a second solid electrolyte layer are laminated in this order, may be prepared as the first laminate, and in the cutting, the third laminate may be cut by applying laser light, in a laminating direction of the third laminate, to the solid electrolyte removed part.

According to the disclosed embodiments, the method for producing the all-solid-state battery which is configured to suppress chipping of the cut end, shedding of the constituent materials, etc., and which is configured to suppress removal of the solid electrolyte layer, can be provided.

BRIEF DESCRIPTION OF THE DRAWINGS

In the accompanying drawings.

DETAILED DESCRIPTION

Figure 1:
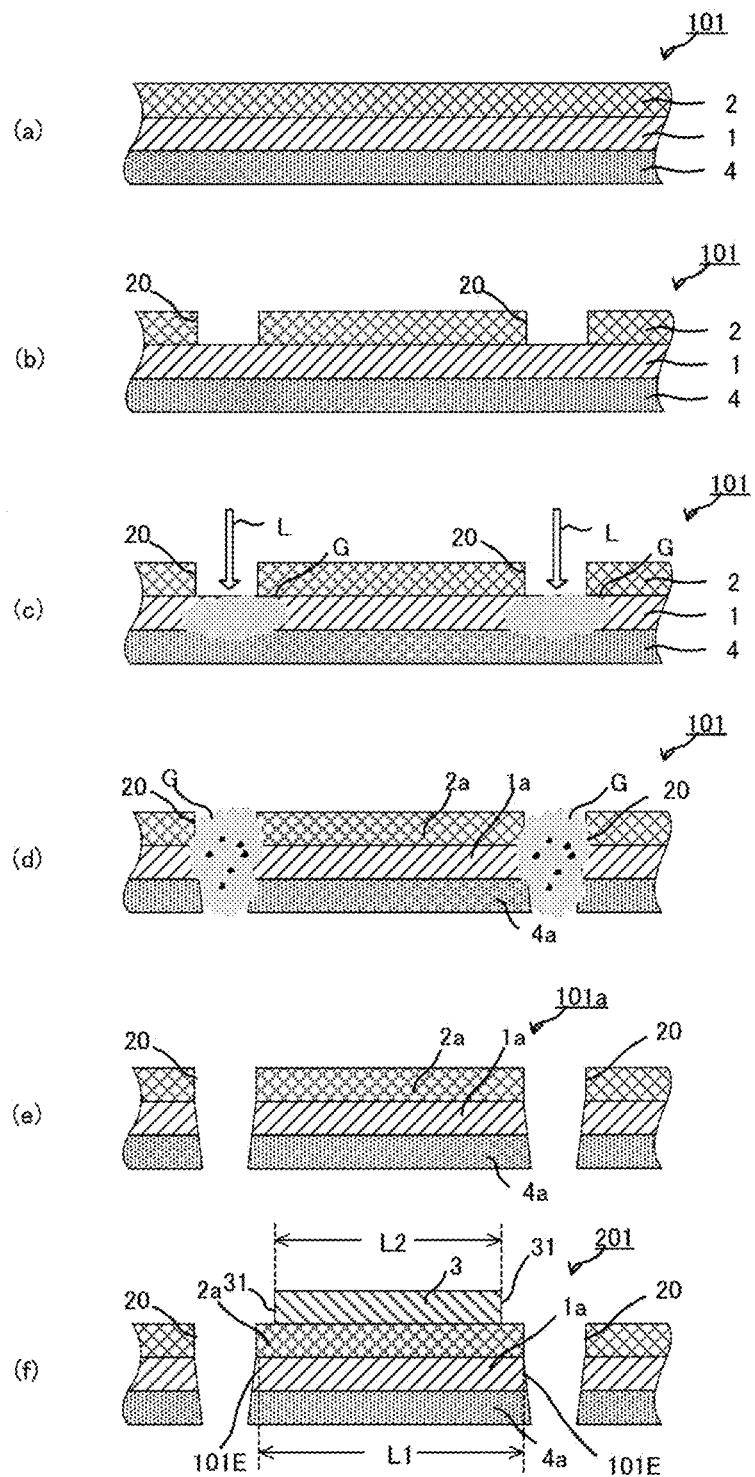
FIG. 1 shows schematic sectional views showing the steps of the all-solid-state battery production method of the disclosed embodiments.

Hereinafter, the all-solid-state battery production method of the disclosed embodiments, will be described.

In the disclosed embodiments, "solid electrolyte layer" means a layer which contains a solid electrolyte and which is present between a cathode and an anode. Also in the disclosed embodiments, "active material layer" means a layer which contains an active material.

A laminate 106 of an active material layer 1 and a solid electrolyte layer 2 is disposed on an electrode current collector 4 to ensure that the solid electrolyte layer 2 comes to the top. When the step of cutting the laminate 106 by applying laser light L thereto from the solid electrolyte layer 2 side (see FIG. 8(a)) is carried out, a removed area 21 (see FIG. 8(c)), which is due to delamination of a part of the solid electrolyte layer 2 at an interface with a different layer such as the active material layer 1, is likely to be produced in or near an area subjected to the application of the laser light L. Accordingly, when a counter electrode-side active material layer 3 is further laminated on the solid electrolyte layer 2a of the laminate 106a subjected to the cutting step, the counter electrode-side active material layer 3 may be laminated in a position including the removed area 21 of the solid electrolyte layer 2a (see FIG. 8(d)), and there is a problem of a decrease in insulation between a pair of active material layers (between the cathode and the anode) of an all-solid-state battery thus obtained.

To suppress the decrease in insulation between the pair of the active material layers (between the cathode and the anode) of the all-solid-state battery, it is needed to laminate the counter electrode-side active material layer 3, with avoiding the removed area 21 of the solid electrolyte layer 2 (see FIG. 8(e)). In this case, to prevent a short circuit, an active material layer 11 present beneath the removed area 21 of the solid electrolyte layer 2, is often removed after the cutting step. Accordingly, there is a problem such as an increased loss of the active material layer 1. Even when the active material layer 11 present beneath the removed area 21 of the solid electrolyte layer 2 is not removed after the cutting step, as described above, it is still needed to laminate the counter electrode-side active material layer 3, with avoiding the removed area 21 of the solid electrolyte layer 2 (see FIG. 8(e)). Accordingly, a poor balance between the surface area of an active material layer 1a and that of the counter electrode-side active material layer 3, is obtained. Accordingly, during charge and discharge of the all-solid-state battery, the active material layer 11 present beneath the removed area 21 is not sufficiently utilized and, as a result, there is a problem of an increased loss of the active material layer 1.

In the case of cutting a laminate 107 by the laser light L, which is a laminate prepared by laminating a counter electrode-side active material layer 3 on the solid electrolyte layer 2 of a laminate of an electrode current collector 4, an active material layer 1 and the solid electrolyte layer 2, that is, laminating the counter electrode-side active material layer 3 on the side opposite to the active material layer 1 (see FIG. 9(a)), the above-described removed area 21, which is due to the delamination of a part of the solid electrolyte layer 2, may expand to the interface between the solid electrolyte layer 2 and the counter electrode-side active material layer 3 (see FIG. 9(c)). As a result, there is a problem of a decrease in insulation between a pair of active material layers 1a and 3 (between the cathode and the anode) of an all-solid-state battery thus obtained.

To avoid overlapping of an area 21', in which the solid electrolyte is expected to be removed by the laser application, with the area in which the counter electrode-side active material layer 3 is formed, the position to which the laser light L is applied, is needed to be a position at a certain distance from the end 31 of the counter electrode-side active material layer 3, thereby obtaining a wide cut part margin 32 (see FIG. 9(d)). In this case, to prevent a short circuit, an active material layer 12 present beneath the area 21', in which the solid electrolyte is expected to be removed, of the laminate subjected to the cutting step, is often removed after the cutting step. Accordingly, there is a problem of an increased loss of the active material layer 1.

In the following descriptions, unless otherwise noted, the delamination of a part of the solid electrolyte layer at an interface with a different layer, will be simply referred to as "removal of the solid electrolyte layer".

The solid electrolyte removal is presumed to be caused by the following mechanism.

Figure 8:
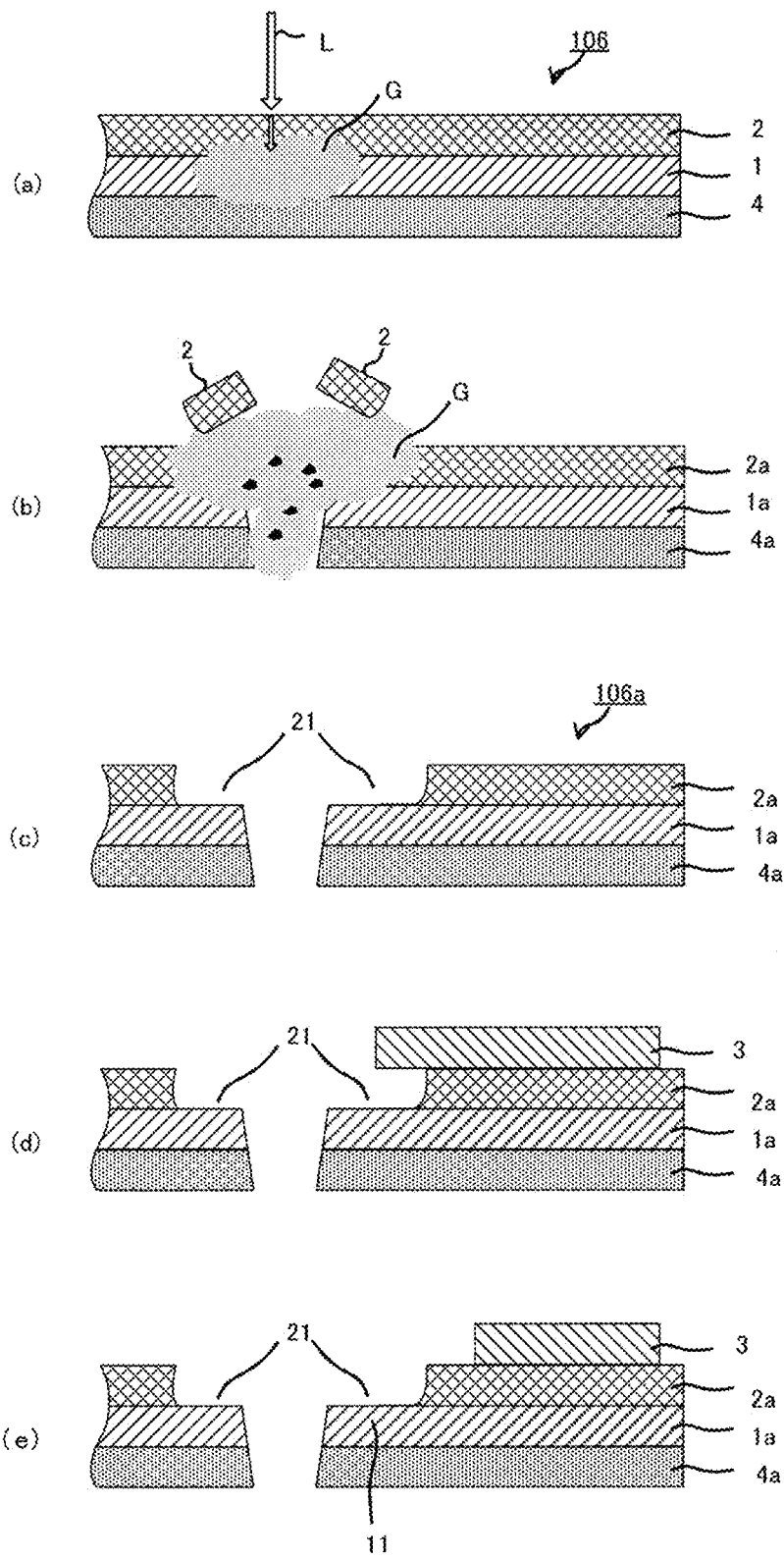
FIG. 8 shows schematic sectional views showing the steps of a conventional all-solid-state battery production method.
Figure 9:
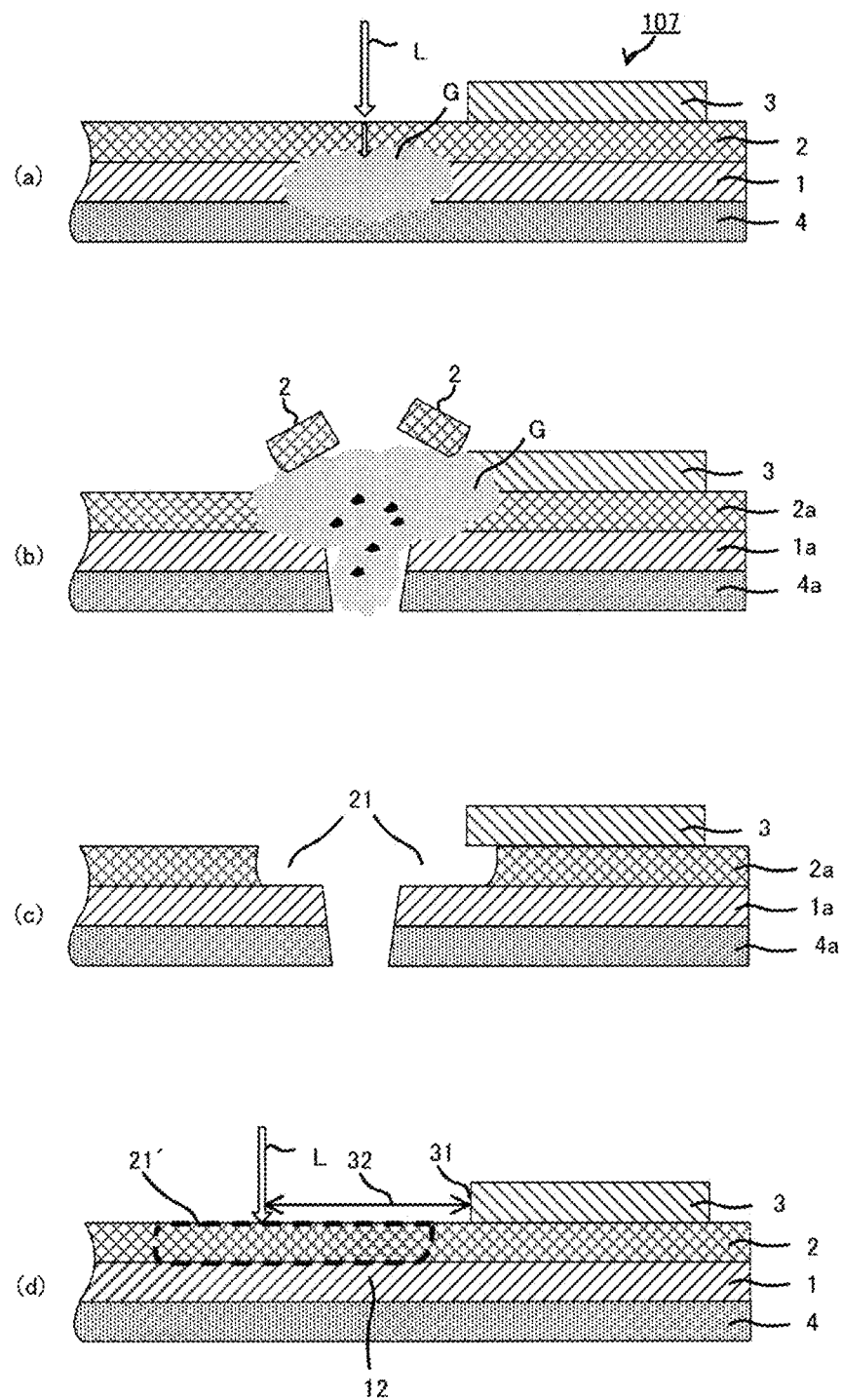
FIG. 9 shows schematic sectional views showing the steps of a conventional all-solid-state battery production method.

For example, as shown in FIG. 8 or 9, in the case of cutting the laminate 106 or 107 comprising the active material layer 1 and the solid electrolyte layer 2 by use of the laser light L, from the viewpoint of high versatility, high power output and low cost, commonly-used laser light of infrared wavelengths is used. The laser light absorptivity of the active material layer 1 and the solid electrolyte layer 2 has wavelength dependence. Accordingly, for example, when the laminate is cut by use of the above-described laser light of infrared wavelengths, the solid electrolyte layer 2 on the active material layer 1 is relatively less prone to cutting.

Accordingly, when the laser light L of such wavelengths is applied to the laminate 106 or 107 from the solid electrolyte layer 2 side, the laser light L passes through the solid electrolyte layer 2 and is absorbed into the active material layer 1 (see FIGS. 8(a) and 9(a)). The constituent materials of the active material layer 1 are evaporated by the energy of the absorbed laser light L, thereby cutting the active material layer 1. An ejected gas G is generated by the evaporation of the constituent materials of the active material layer 1. The ejected gas G is sealed in the laminate 106 or 107 by the solid electrolyte layer 2, that is, a free path is blocked (see FIGS. 8(a) and 9(a)). Accordingly, the ejected gas G sealed in the laminate 106 or 107 has no way out, thereby increasing an expansion pressure inside the laminate structure. As a result, it is presumed that a part of the solid electrolyte layer 2 is removed (see FIGS. 8(b) and 9(b)) to produce the removed area 21 (see FIGS. 8(c) and 9(c)).

Figure 10:
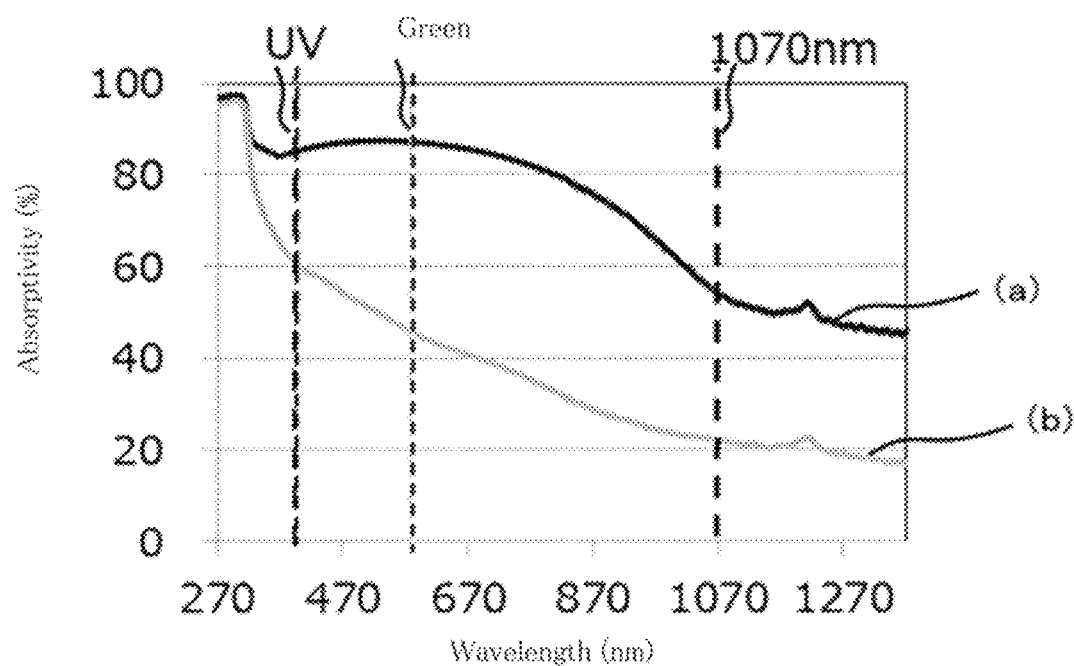
FIG. 10 is a view showing the results of a model experiment to confirm a difference between the wavelength dependence of the laser light absorptivity of an active material layer 1 and that of the laser light absorptivity of a solid electrolyte layer 2.

FIG. 10 is a view showing the results of a model experiment to confirm a difference between the wavelength dependence of the laser light absorptivity of an active material layer 1 and that of the laser light absorptivity of a solid electrolyte layer 2. In FIG. 10, a curve (a) is a graph showing the wavelength dependence of the laser light absorptivity of a Si particle layer composed of Si particles, which are generally used as an anode active material. Also in FIG. 10, a curve (b) is a graph showing the wavelength dependence of the laser light absorptivity of a LiI—$Li_2S$—$P_2S_5$ layer composed of LiI—$Li_2S$—$P_2S_5$, which is a material that is generally used as a solid electrolyte.

As shown by the curve (a) in FIG. 10, with respect to laser light of a wavelength of approximately 1070 nm, the Si particle layer has a laser light absorptivity of about 50%. Meanwhile, as shown by the curve (b) in FIG. 10, with respect to laser light of a wavelength of approximately 1070 nm, the LiI —$Li_2S$—$P_2S_5$ has a laser light absorptivity of only about 20%.

The laser light of a wavelength of approximately 1070 nm was applied to a laminate of the Si particle layer (a model layer of the active material layer) and the LiI—Li$_2$S—P$_2$S$_5$ layer (a model layer of the solid electrolyte layer), from the LiI—Li$_2$S—P$_2$S$_5$ layer side. As a result, removal of a part of the LiI—Li$_2$S—P$_2$S$_5$ layer from the Si particle layer, occurred.

The reason is presumed as follows: the laser light of a wavelength of approximately 1070 nm, for which the LiI—Li$_2$S—P$_2$S$_5$ layer and the Si particle layer show the above-described absorptivities, passed through the LiI—Li$_2$S—P$_2$S$_5$ layer and was absorbed into the Si particle layer.

The graphs shown in FIG. 10 were obtained by use of a spectrometer ("UV-260" manufactured by Shimadzu Corporation) and by the following method.

First, barium sulfate was poured in a hole with a depth of about 3 mm, which is the measurement section of the spectrometer, and then compacted, thereby forming a barium sulfate layer with a thickness of about 2 mm. Then, a Si particle powder or LiI—Li$_2$S—P$_2$S$_5$ powder, which is a measurement target, was poured thereon and compacted, thereby forming a layer with a thickness of about 1 mm. Then, light was applied to the upper side of the measurement section, with changing the wavelength of the applied light, thereby measuring reflectances. Absorptivities were calculated from the reflectances and plotted with respect to the wavelengths of the light.

In the disclosed embodiments, "light absorptivity" is a value obtained as follows. Light of a certain wavelength is applied to a target; from the amount of the applied light, the amount of light reflected from the target and the amount of light passed through the target, are subtracted to obtain an absorption; and the absorption is divided by the amount of the applied light, thereby obtaining the light absorptivity value.

With respect to the above-described conventional production method, the all-solid-battery production method of the disclosed embodiments is characterized as follows.

The all-solid-state battery production method of the disclosed embodiments comprises: preparing a first laminate by laminating a first solid electrolyte layer on a first active material layer, forming a solid electrolyte removed part by removing a part of the first solid electrolyte layer on the first active material layer, and cutting the first laminate by applying laser light, in a laminating direction of the first laminate, to the solid electrolyte removed part.

According to the production method of the disclosed embodiments, the first laminate prepared by laminating the first solid electrolyte layer on the first active material layer, is cut by use of laser light. Due to heat generated by the laser application, the constituent materials of the first active material layer are melted, and the melted materials solidify at the cut end. Accordingly, generation of problems (e.g., chipping of the cut end and shedding of the constituent materials) can be suppressed.

According to the disclosed embodiments, the first laminate is cut by applying laser light, in the laminating direction of the first laminate, to the solid electrolyte removed part formed by removing a part of the first solid electrolyte layer on the first active material layer. Accordingly, at the time of cutting the first laminate, removal of a part of the first solid electrolyte layer can be suppressed.

As just described, according to the production method of the disclosed embodiments, removal of a part of the first solid electrolyte layer can be suppressed at the time of cutting the first laminate. Accordingly, insulation between the pair of the active material layers (between the anode layer and the cathode layer) of the all-solid-state battery can be ensured, without increasing the loss of the first active material layer.

Hereinafter, the all-solid-state battery production method of the disclosed embodiments will be described in detail.

1. All-Solid-State Battery Production Method (1-1)

FIGS. 1(a) to 1(f) are schematic views of the first embodiment of the all-solid-state battery production method.

First, as shown in FIG. 1(a), the step of preparing a first laminate 101 (an electrode current collector 4—a first active material layer 1—a first solid electrolyte layer 2) is carried out, in which the first active material layer 1 is laminated on the electrode current collector 4, and the first solid electrolyte layer 2 is laminated on the first active material layer 1.

Next, as shown in FIG. 1(b), the step of forming a solid electrolyte removed part 20 by removing a part of the first solid electrolyte layer 2 on the first active material layer 1, is carried out.

Next, as shown in FIGS. 1(c) and (d), the step of cutting the first laminate 101 by applying laser light, in the laminating direction of the first laminate 101, to the solid electrolyte removed part 20, is carried out.

As a result, a first intermediate laminate 101a (an electrode current collector 4a—a first active material layer 1a—a first solid electrolyte layer 2a) is obtained, in which the first solid electrolyte layer 2a subjected to the cutting step is laminated on the first active material layer 1a subjected to the cutting step (see FIG. 1(e)).

Then, an additional step is carried out (such as laminating the counter electrode-side active material layer 3 on the first solid electrolyte layer 2a of the thus-obtained first intermediate laminate 101a (the electrode current collector 4a—the first active material layer 1a-the first solid electrolyte layer 2a) and further laminating a counter electrode-side current collector), thereby obtaining an all-solid-state battery 201 (see FIG. 1(f)).

(1-2)

FIGS. 2(a) to 2(e) are schematic views of the second embodiment of the all-solid-state battery production method.

First, as shown in FIG. 2(a), the step of preparing a second laminate 102 is carried out, in which the first active material layer 1 is laminated on the electrode current collector 4; the first solid electrolyte layer 2 is laminated on the first active material layer 1; and the counter electrode-side active material layer 3 is laminated on one side of the first solid electrolyte layer 2, which is opposite to the side on which the first active material layer 1 is laminated.

Next, as shown in FIG. 2(b), the step of forming the solid electrolyte removed part 20 by removing a part of the first solid electrolyte layer 2 on the first active material layer 1, is carried out.

Next, as shown in FIGS. 2(c) and (d), the step of cutting the second laminate 102 by applying the laser light L, in the laminating direction of the second laminate 102, to the solid electrolyte removed part 20, is carried out.

As a result, a second intermediate laminate 102a (an electrode current collector 4a—a first active material layer 1a—a first solid electrolyte layer 2a—the counter electrode-side active material layer 3) is obtained, in which the first solid electrolyte layer 2a subjected to the cutting step is laminated on the first active material layer 1a subjected to the cutting step, and the counter electrode-side active material layer 3 is laminated on one side of the first solid electrolyte layer 2a subjected to the cutting step, which is opposite to the side on which the first active material layer 1a is laminated (see FIG. 2(d)). Then, an additional step is carried out (such as further laminating a counter electrode-side current collector), thereby obtaining an all-solid-state battery 202 (see FIG. 2(e)).

In the all-solid-state batteries of the first and second embodiments, in each of which the counter electrode-side active material layer 3 is laminated on the first active material layer 1a via the first solid electrolyte layer 2a, the first active material layer 1a. and the counter electrode-side active material layer 3 are formed to ensure that the length in the longitudinal direction of the first active material layer 1a is longer than the length in the longitudinal direction of the counter electrode-side active material layer 3, or vice versa.

The reason is as follows. The length in the longitudinal direction of the first solid electrolyte layer 1a, is needed to be longer than the length in the longitudinal direction of at least one of the first active material layer 1a and the counter electrode-side active material layer 3 (condition α). Meanwhile, in the case of forming the laminate in which the counter electrode-side active material layer 3 is laminated on the first active material layer 1a via the first solid electrolyte layer 2a, it is difficult to form the first solid electrolyte layer 2a larger than the first active material layer 1a formed therebeneath. That is, from the viewpoint of ease of lamination of the first solid electrolyte layer 2a, the first solid electrolyte layer 2a is formed to have the same size as or a smaller size than the first active material layer 1a formed therebeneath. Accordingly, to fulfill the condition α, the counter electrode-side active material layer 3 formed on the first solid electrolyte layer 2a, is needed to be formed smaller than the first solid electrolyte layer 2a. Accordingly, the first active material layer 1a is formed to ensure that the length in the longitudinal direction of the first active material layer 1a is longer than the length in the longitudinal direction of the counter electrode-side active material layer 3.

Due to the above reason, in the all-solid-state battery in which the counter electrode-side active material layer 3 is laminated on the first active material layer 1a via the first solid electrolyte layer 2a, therefore, to fulfill the condition α, the first active material layer 1a and the counter electrode-side active material layer 3 are formed to ensure that the length in the longitudinal direction of the first active material layer 1a is longer than the length in the longitudinal direction of the counter electrode-side active material layer 3, or vice versa.

Of the first active material layer 1a and the counter electrode-side active material layer 3, from the viewpoint of suppressing a short circuit therebetween, one having a shorter length in the longitudinal direction, is needed to be laminated to ensure that the whole layer is formed within the range of the area in which the first solid electrolyte layer 2a is formed.

The First Embodiment

Hereinafter, the production method of the disclosed embodiments will be described in more detail, with reference to the all-solid-state battery production method described in (1-1) (FIGS. 1(a) to 1(f)).
A-1. Preparing Step
First, the step of preparing the first laminate 101 is carried out, in which the first active material layer 1 is laminated on the electrode current collector 4, and the first solid electrolyte layer 2 is laminated on the first active material layer 1 (see FIG. 1(a)).

(1) Active Material Layer
In the production method of the disclosed embodiments, the first active material layer 1 may be an anode active material layer containing an anode active material, or it may be a cathode active material layer containing a cathode active material.
(1-a) Anode Active Material Layer
The anode active material layer contains at least an anode active material. As needed, it contains other components such as a solid electrolyte, an electroconductive material and a binder.

As the anode active material, examples include, but are not limited to, a carbon active material (a carbonaceous material), an oxide active material and a metal active material.

As the carbon active material (the carbonaceous material), examples include, but are not limited to, mesocarbon microbeads (MCMB), graphite (e.g., highly oriented pyrolytic graphite or HOPG), hard carbon and soft carbon.

As the oxide active material, examples include, but are not limited to, $Nb_2O_5$, $Li_4Ti_5O_{12}$ and SiO. As the metal active material, examples include, but are not limited to, In, Al, Si and Sn.

The Si may be an elemental Si or a Si alloy.

As the form of the anode active material, examples include, but are not limited to, a particulate form.

When the anode active material is in a particulate form, the average particle diameter ($D_{50}$) of the anode active material particles is generally in a range of from 1 nm to 100 μm, or in a range of from 10 nm to 30 μm. When the average particle diameter of the particles is too small, poor handleability may be obtained. When the average particle diameter of the particles is too large, it may be difficult to flatten the anode active material layer.

The percentage of the anode active material in the anode active material layer, is not particularly limited. For example, it may be in 40 mass % or more and 99 mass % or less, or it may be 60 mass % or more and 80 mass % or less.

The solid electrolyte contained in the anode active material layer maybe any one of a crystalline solid electrolyte, an amorphous solid electrolyte and a solid electrolyte glass ceramic. The solid electrolyte contained in the anode active material layer may be the same solid electrolyte as the one used in the below-described first solid electrolyte layer 2.

The anode active material layer may contain other components such as an electroconductive material. As the electroconductive material, examples include, but are not limited to, carbonaceous materials such as Acetylene Black (AB), Ketjen Black (KB), carbon nanotube (CNT), carbon fiber (CNF) and vapor-grown carbon fiber (VGCF).

The anode active material layer may contain other components such as a binder. As the binder, examples include, but are not limited to, polyvinylidene fluoride (PVdF), polytetrafluoroethylene (PTFE), butylene rubber (BR), styrene-butadiene rubber (SBR), polyvinyl butyral (PVB) and acrylic resin.
(1-b) Cathode Active Material Layer
The cathode active material layer contains at least a cathode active material. As needed, it contains other components such as a solid electrolyte, an electroconductive material and a binder. In addition, the cathode active material layer may contain a thickener.

As the cathode active material, conventionally-known materials may be used. When the all-solid-state battery is a lithium battery, as the cathode active material, examples include, but are not limited to, lithium cobaltate ($LiCoO_2$), lithium nickelate ($LiNiO_2$), $Li_{1+x}Ni_{1/3}Mn_{1/3}Co_{1/3}O_2$, lithium manganate (LiMn$_2$O$_4$), different element-substituted Li—Mn spinels represented by the composition formula Li$_{1+x}$Mn$_{2-x-y}$M$_y$O$_4$ (where M is at least one selected from the group consisting of Al, Mg, Co, Fe, Ni and Zn), lithium titanate (Li$_x$ TiO$_y$), and lithium metal phosphate (LiMPO$_4$, M=Fe, Mn, Co, Ni).

The form of the cathode active material is not particularly limited. It may be a film form or a particulate form.

The cathode active material may be coated with a solid electrolyte to form a coating layer thereon.

The coating layer may contain a substance which has lithium ion conductivity, which is not fluidized even when it is brought into contact with an active material or a solid electrolyte, and which can retain the form of the coating layer.

When the cathode active material is in a particulate form, the average particle diameter (D$_{50}$) of the cathode active material particles is generally in a range of from 1 nm to 100 μm, or it may be in a range of from 10 nm to 30 μm.

The percentage of the cathode active material in the cathode active material layer, is not particularly limited. For example, it may be 40 mass % or more and 99 mass % or less, or it may be 60 mass % or more and 90 mass % or less.

As the binder, the solid electrolyte and the electroconductive material, the same materials as those used in the material for the anode, may be used.

The first active material layer 1 may be formed by the following method, for example. First, a dispersion containing materials for forming an anode active material layer (hereinafter, it will be referred to as "anode mixture") or materials for forming a cathode active material layer (hereinafter, it will be referred to as "cathode mixture") and a removable binder is applied on the electrode current collector 4 to form a coating film. Then, the coating film is dried, thereby forming the first active material layer 1.

Another method for forming the first active material layer 1 is as follows. First, the dispersion containing the anode or cathode mixture and the removable binder, is applied on a support other than the electrode current collector 4 to form a coating film. Then, the coating film is dried, thereby forming the first active material layer 1. The first active material layer 1 may be removed from the support and laminated on the electrode current collector 4.

When the first active material layer 1 is the anode active material layer, the first active material layer 1 may be formed on an anode current collector.

As the material for the anode current collector, examples include, but are not limited to, copper, copper alloy, nickel and nickel alloy. Examples also include, but are not limited to, copper plated with Ni, Cr, C or the like, copper on which Ni, Cr, C or the like is deposited, nickel plated with Cr, C or the like, and nickel on which Cr, C or the like is deposited. As the form of the anode current collector, examples include, but are not limited to, a foil form, a plate form and a mesh form.

When the first active material layer 1 is the cathode active material layer, the first active material layer 1 may be formed on a cathode current collector.

As the material for the cathode current collector, examples include, but are not limited to, metal materials such as SUS, Ni, Cr, Au, Pt, Al, Fe, Ti, Zn and Cu. Examples also include, but are not limited to, these materials which are plated with Ni, Cr, C or the like, and these materials on which Ni, Cr, C or the like is deposited. As the form of the cathode current collector, examples include, but are not limited to, a foil form, a plate form and a mesh form.

Another method for forming the first active material layer 1 is as follows. The anode or cathode mixture is pressure-formed by applying a given press pressure, thereby forming the first active material layer 1.

Another method for forming the first active material layer 1 is as follows. First, a powder containing the anode or cathode mixture and the removable binder, is formed into an anode or cathode active material layer by compression. Then, the layer thus formed is dried by heating, thereby forming the first active material layer 1.

(2) Solid Electrolyte Layer

The first solid electrolyte layer 2 contains a solid electrolyte. As needed, it contains other components such as a binder.

As the solid electrolyte, a conventionally-known material may be used. The solid electrolyte may be an oxide-based solid electrolyte with high Li ion conductivity, and a sulfide-based solid electrolyte.

As the oxide-based solid electrolyte, examples include, but are not limited to, Li$_{6.25}$La$_3$Zr$_2$Al$_{0.25}$O$_{12}$, Li$_3$PO$_4$ and LiPON.

As the oxide-based solid electrolyte, examples also include, but are not limited to, insulating ceramics such as alumina and zirconia; oxide-based amorphous solid electrolytes such as Li$_2$O—B$_2$O$_3$—P$_2$O$_5$ and Li$_2$O—SiO$_2$; and oxide-based and oxynitride-based crystalline solid electrolytes such as LiI, Li$_3$N, Li$_5$La$_3$Ta$_2$O$_{12}$, Li$_7$La$_3$Zr$_2$O$_{12}$, Li$_6$BaLa$_2$Ta$_2$O$_{12}$, Li$_3$PO$_{(4-3/2w)}$Nw$_{(w<1)}$ and Li$_{3.6}$Si$_{0.6}$P$_{0.4}$O$_4$.

As the sulfide-based solid electrolyte, examples include, but are not limited to, sulfide-based amorphous solid electrolytes such as Li$_2$S—SiS$_2$, LiI—Li$_2$S—SiS$_2$, LiI—Li$_2$S—P$_2$S$_5$, LiI —Li$_2$S—P$_2$O$_5$, LiI—Li$_3$PO$_4$—P$_2$S$_5$ and Li$_2$S—P$_2$S$_5$; glass ceramics such as Li$_7$P$_3$S$_{11}$ and Li$_{3.25}$P$_{0.75}$S$_4$; and sulfide-based crystalline solid electrolytes such as thio-LISIO-based crystals (e.g., Li$_{3.24}$P$_{0.24}$Ge$_{0.76}$S$_4$).

A solid electrolyte in a powder form may be used as the solid electrolyte for forming the first solid electrolyte layer 2. In this case, the average particle diameter (D$_{50}$) of solid electrolyte particles constituting the solid electrolyte powder is in a range of from 1 nm to 100 μm, for example, or it may be in a range of from 10 nm to 30 μm, for example.

As the binder used in the first solid electrolyte layer 2, the same binder as the one used in the above-described anode active material layer, may be used.

As the solid electrolyte, one or more kinds of solid electrolytes may be used. In the case of using two or more kinds of solid electrolytes, they may be mixed together, or they may be formed into layers to obtain a multilayer structure.

When the first solid electrolyte layer 2 is formed into a double-layer structure, for example, a sulfide solid electrolyte and an oxide solid electrolyte may be disposed on the first active material layer 1 side and the below-described counter electrode-side active material layer 3 side, respectively, or they may be disposed in reverse order. They may be disposed in any order, as long as it is an order corresponding to the potential windows of the solid electrolytes.

The percentage of the solid electrolyte in the first solid electrolyte layer 2 is not particularly limited. For example, it may be 50 mass % or more, may be in a range of from 60 mass to 100 mass %, may be in a range of from 70 mass % to 100 mass %, or may be 100 mass %.

The first solid electrolyte layer 2 contains other components. As the other components, examples include, but are not limited to, a binder, a plasticizer and a dispersant.

As the method for forming the first solid electrolyte layer 2, examples include, but are not limited to, the same methods as the above-described methods for forming the first active material layer 1.

When the layers constituting the first laminate 101 are formed by pressure forming, the first laminate 101 may be produced as follows. First, the first active material layer 1 is formed by pressure-forming the anode or cathode mixture. Then, a solid electrolyte material powder containing a solid electrolyte powder and, as needed, other components, is deposited on one side of the first active material layer 1. The first solid electrolyte layer 2 is formed by pressure-forming the deposited powder, thereby producing the first laminate 101.

Another method for producing the first laminate 101 is as follows. First, the anode or cathode mixture is put in a pressurized cylinder for powder press forming and deposited to a uniform thickness, thereby forming an anode or cathode mixture layer. On the anode or cathode mixture layer, the solid electrolyte material powder was placed and deposited to a uniform thickness, thereby forming a solid electrolyte material powder layer. A powder deposit composed of two deposited powder layers thus formed, is pressure-formed at once, thereby producing the first laminate 101.

B-1. Solid Electrolyte Removed Part Forming Step

Next, the step of forming the solid electrolyte removed part 20 by removing a part of the first solid electrolyte layer 2 on the first active material layer 1 (the solid electrolyte removed part forming step) is carried out (see FIG. 1(b)). The solid electrolyte removed part 20 is formed in a position overlapping with a line to which the laser light L is expected to be applied in the below-described cutting step. In general, the solid electrolyte removed part 20 is formed while small margin areas are disposed on both sides of the line.

The solid electrolyte removed part 20 may be formed as follows, for example. The laser light is applied to an area of the first solid electrolyte layer 2, in which the solid electrolyte removed part 20 is expected to be formed, thereby evaporating a small part of the first active material layer 1 and removing a small part of the first solid electrolyte layer 2. As a result, the solid electrolyte removed part 20 is formed. In this case, the laser light used for the formation of the solid electrolyte removed part 20, may be applied (1) by appropriately controlling the wavelength of the applied laser light, (2) at a lower intensity than the intensity of the laser light L that is applied to the first laminate 101 in the below-described cutting step, and (3) for a shorter time than the time for which the laser light L is applied to the first laminate 101 in the cutting step.

In the case of forming the solid electrolyte removed part 20 by laser light application, the solid electrolyte removed part 20 may be formed as follows. Laser light of a short wavelength-side wavelength, which can be absorbed into the first solid electrolyte layer 2, is applied to the area of the first solid electrolyte layer 2, in which the solid electrolyte removed part 20 is expected to be formed, thereby evaporating the constituent materials of the first solid electrolyte layer 2. As a result, the solid electrolyte removed part 20 is formed.

The method for forming the solid electrolyte removed part 20 is not limited to the above-described methods. For example, the solid electrolyte removed part 20 may be formed as follows. First, a heater at a given temperature is placed on the area in which the solid electrolyte removed part 20 is expected to be formed. The heater is left thereon for a given time to evaporate the first solid electrolyte material, thereby forming the solid electrolyte removed part 20. Also, the solid electrolyte removed part 20 may be formed by mechanically cutting the area in which the solid electrolyte removed part 20 is expected to be formed, by use of a cutting blade, etc.

The width of the solid electrolyte removed part 20 is not particularly limited. For example, it may be in a range of from 50 μm to 1000 μm. If the width of the solid electrolyte removed part 20 is less than 50 μm, it is difficult to form the solid electrolyte removed part 20. In addition, if the width of the solid electrolyte removed part 20 is less than 50 μm, a free path of the ejected gas G that is generated in the below-described cutting step, is not fully ensured, and removal of the first solid electrolyte layer 2 cannot be sufficiently suppressed in the cutting step. On the other hand, if the width of the solid electrolyte removed part 20 is more than 1000 μm, there is an increased loss of the first active material layer 2. Accordingly, the width of the solid electrolyte removed part 20 may be 1000 μm or less.

FIG. 1(b) shows an example in which two solid electrolyte removed parts 20 and 20 are formed on the first active material layer 1 by removing a part of the first solid electrolyte layer 2. In the below-described step shown in FIG. 1(f), the two solid electrolyte removed parts 20 and 20 are formed with a space therebetween, in which the counter electrode-side active material layer 3 is expected to be laminated on the first solid electrolyte layer 2.

C-1. Cutting Step

Next, as shown in FIGS. 1(c) and (d), the step of cutting the first laminate 101 by applying laser light, in the laminating direction of the first laminate 101, to the solid electrolyte removed part 20 from the first solid electrolyte layer 2 side, is carried out.

As a result, the first intermediate laminate 101a (the electrode current collector 4a—the first active material layer 1a—the first solid electrolyte layer 2a) is obtained, in which the first solid electrolyte layer 2a subjected to the cutting step is laminated on the first active material layer 1a subjected to the cutting step (see FIG. 1(e)).

In the cutting step, the laser light L applied to the first laminate 101 passes through the solid electrolyte removed part 20 and is absorbed into the first active material layer 1 (see FIG. 1(c)). The constituent materials of the first active material layer 1 are evaporated by the energy of the absorbed laser light, thereby cutting the first active material layer 1. The ejected gas G is generated by the evaporation of the constituent materials of the first active material layer 1. The ejected gas G passes through the free path formed in the solid electrolyte removed part 20 of the first solid electrolyte layer 2 and is released to the outside (see FIG. 1(d)). As a result, removal of a part of the first solid electrolyte layer 2 can be suppressed at the time of cutting the first laminate 101. Accordingly, the first laminate 101 can be cut without expanding the removed area of the first solid electrolyte layer 2 larger than the previously-formed solid electrolyte removed part 20.

Next, an additional step is carried out (such as laminating the counter electrode-side active material layer 3 on the first solid electrolyte layer 2a of the first intermediate laminate 101a (the electrode current collector 4a—the first active material layer 1a—the first solid electrolyte layer 2a) and further laminating a counter electrode-side current collector), thereby obtaining the all-solid-state battery 201 (see FIG. 1(f)).

As shown in FIG. 1(f), when the counter electrode-side active material layer 3 is formed to ensure that the length L2 in the longitudinal direction of the counter electrode-side active material layer 3 is shorter than the length L1 in the longitudinal direction of the first active material layer 1a, the counter electrode-side active material layer 3 is laminated to ensure that the whole layer is formed within the range of the area in which the solid electrolyte layer 2a subjected to the cutting step is formed.

As the method for forming the counter electrode-side active material layer 3, examples include, but are not limited to, the same methods as the above-described methods for forming the active material layer 1.

As described above, in the production method of the disclosed embodiments, the solid electrolyte removed part 20 is formed in the first solid electrolyte layer 2, and the laser light L is applied to the solid electrolyte removed part 20. Accordingly, at the time of cutting the first laminate 101, removal of a part of the first solid electrolyte layer 2 can be suppressed. Accordingly, as shown in FIG. 1(f), when the counter electrode-side active material layer 3 is laminated on the first intermediate laminate 101a subjected to the cutting step, an end 31 of the counter electrode-side active material layer 3 can be disposed in a position close to a cut end 101E formed by the laser application.

Accordingly, insulation between the active material layer 1a and counter electrode-side active material layer 3 of the thus-obtained all-solid-state battery 201 can be ensured, without increasing the loss of the first active material layer 1.

FIGS. 3(a) to 3(f) show a variation of the embodiment described in the above (1-1) (FIGS. 1(a) to 1(f)).

Figure 3:
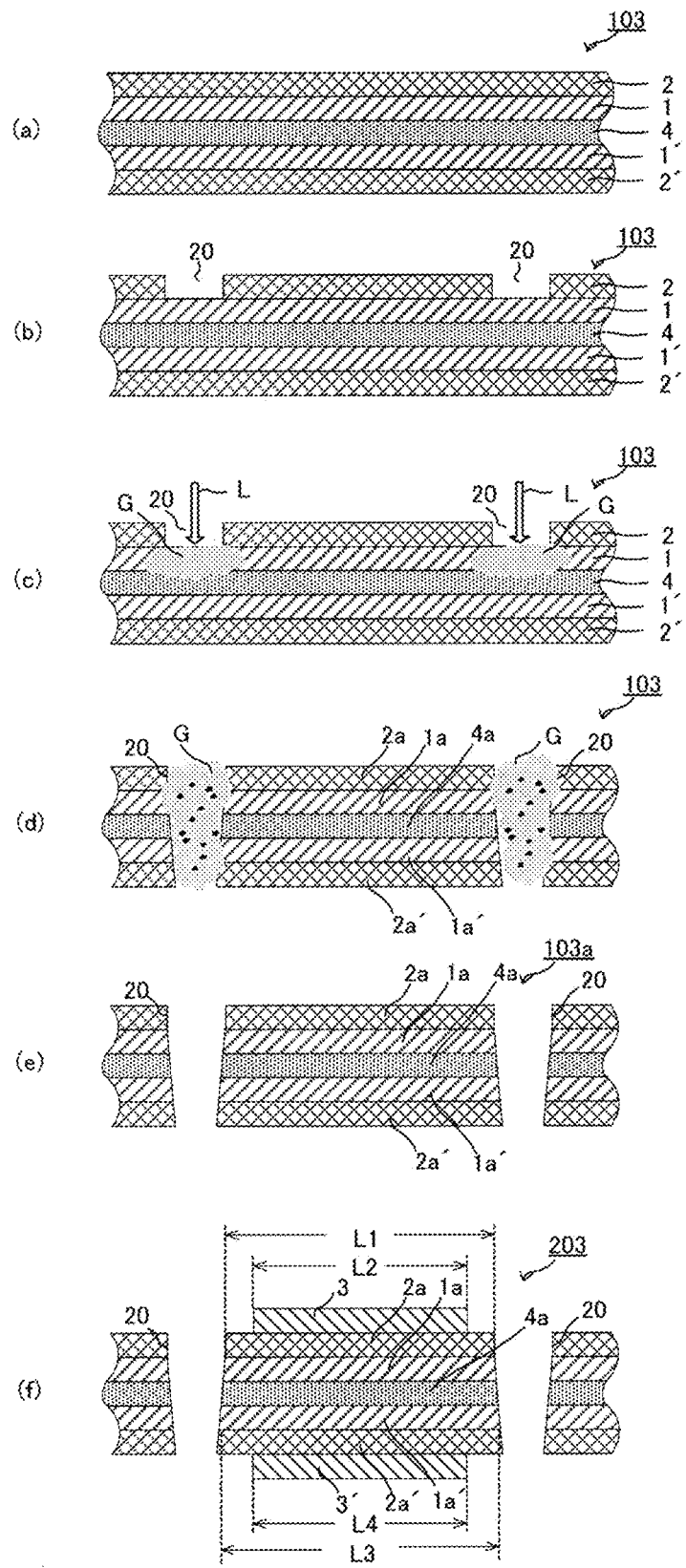
FIG. 3 shows schematic sectional views showing the steps of the all-solid-state battery production method of the disclosed embodiments.

In the example shown in FIGS. 3(a) to 3(f), first, as shown in FIG. 3(a), a third laminate preparing step is carried out, which is a step of preparing a third laminate 103 in which the first solid electrolyte layer 2, the first active material layer 1, the electrode current collector 4, a second active material layer 1' and a second solid electrolyte layer 2' are laminated in this order.

In the disclosed embodiments, the second active material layer is a layer containing an active material that has the same polarity as the first active material layer.

As the method for forming the second active material layer 1', examples include, but are not limited to, the same methods as the methods for forming the first active material layer 1. As the method for forming the second solid electrolyte layer 2', examples include, but are not limited to, the same methods as the methods for forming the first solid electrolyte layer 2.

The formation of the first active material layer 1 and the first solid electrolyte layer 2 can be carried out in the same manner as the formation described with reference to FIG. 1(a).

Next, as shown in FIG. 3(b), the step of forming the solid electrolyte removed part 20 by removing a part of the first solid electrolyte layer 2 on the first active material layer 1, is carried out.

The step of forming the solid electrolyte removed part can be carried out in the same manner as the solid electrolyte removed part forming step described with reference to FIG. 1(b).

In the step of forming the solid electrolyte removed part, a solid electrolyte removed part (not shown) may be formed by removing a part of the second solid electrolyte layer 2' on the second active material layer 1'.

Next, as shown in FIGS. 3(c) and (d), the step of cutting the third laminate 103 by applying laser light, in the laminating direction of the third laminate 103, to the solid electrolyte removed part 20 from the first solid electrolyte layer 2 side, is carried out.

In the cutting step shown in FIGS. 3(c) and (d), the laser light L applied to the first laminate 101 is absorbed into not only the first active material layer 1, but also at least the electrode current collector 4 and the second active material layer 1'. The ejected gas G is generated by the evaporation of the constituent materials of the first active material layer 1, the electrode current collector 4 and the second active material layer 1'. The ejected gas G passes through the free path formed in the solid electrolyte removed part 20 and the cut part of the first active material layer 1 and the electrode current collector 4, and it is released to the outside (see FIG. 1(d)).

As a result, a third intermediate laminate 103a (the first solid electrolyte layer 2a—the first active material layer 1a—the electrode current collector 4a—a second active material layer 1a—a second solid electrolyte layer 2a') is obtained, in which the first solid electrolyte layer 2a subjected to the cutting step, the first active material layer 1a subjected to the cutting step, the electrode current collector 4a subjected to the cutting step, the second active material layer 1a' subjected to the cutting step, and the second solid electrolyte layer 2a' subjected to the cutting step, are laminated in this order (see FIG. 3(e)).

Next, an additional step is carried out (such as laminating the counter electrode-side active material layers 3 and 3' on the first solid electrolyte layer 2a and second solid electrolyte layer 2a ' of the third intermediate laminate 103a (the first solid electrolyte layer 2a—the first active material layer 1a—the electrode current collector 4a—the second active material layer 1a'—the second solid electrolyte layer 2a'), respectively, and further laminating a counter electrode-side current collector), thereby obtaining an all-solid-state battery 203 (see FIG. 3(f)).

In the example shown in FIG. 3(f), the counter electrode-side active material layer 3 is formed to ensure that the length L2 in the longitudinal direction of the counter electrode-side active material layer 3 is shorter than the length L1 in the longitudinal direction of the first active material layer 1a, and the counter electrode-side active material layer 3' is formed to ensure that the length L4 in the longitudinal direction of the counter electrode-side active material layer 3' is shorter than the length L3 in the longitudinal direction of the second active material layer 1a'.

In this case, as shown in FIG. 3(f), the counter electrode-side active material layer 3 is laminated to ensure that the whole layer is formed within the range of the area in which the first solid electrolyte layer 2a subjected to the cutting step is formed, and the counter electrode-side active material layer 3' is laminated to ensure that the whole layer is formed within the range of the area in which the second solid electrolyte layer 2a ' subjected to the cutting step is formed.

As described above, in the production method of the disclosed embodiments shown in FIGS. 3(a) to 3(f), the solid electrolyte removed part 20 is formed in the first solid electrolyte layer 2, and the laser light L is applied to the solid electrolyte removed part 20. Accordingly, at the time of cutting the third laminate 103, removal of a part of the first solid electrolyte layer 2 can be suppressed. Accordingly, for the same reason as described above relating to the embodiment shown in FIGS. 1(a) to 1(f), insulation between the first active material layer 1a and counter electrode-side active material layer 3 of the thus-obtained all-solid-state battery 203 and insulation between the second active material layer 1a' and counter electrode-side active material layer 3' of the thus-obtained all-solid-state battery 203 can be ensured, without increasing the loss of the first active material layer 1.

Figure 4:
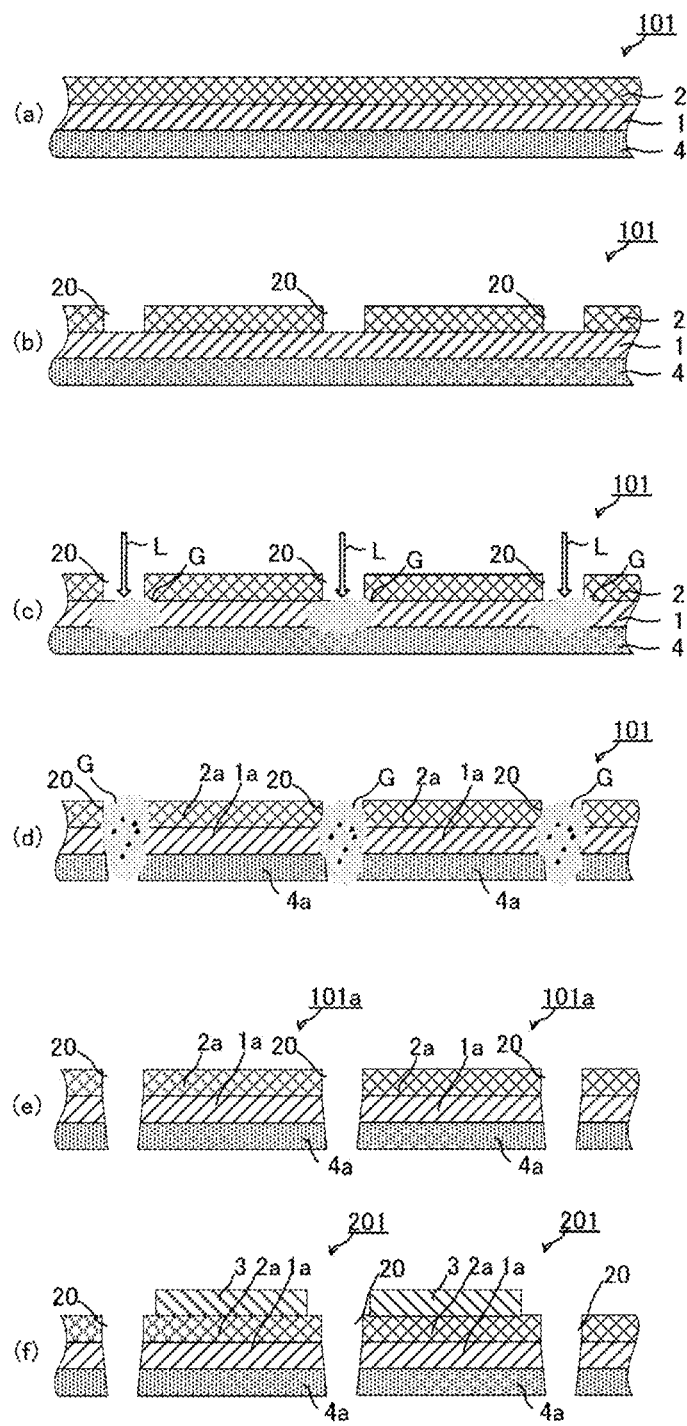
FIG. 4 shows schematic sectional views showing the steps of the all-solid-state battery production method of the disclosed embodiments.

On the embodiment shown in FIGS. 1(a) to 1(f), the steps shown in FIGS. 4(c) to 4(f) may be carried out in the same manner as the steps shown in FIGS. 1(c) to 1(f), after the first laminate 101 (the electrode current collector 4—the first active material layer 1—the first solid electrolyte layer 2) is, as shown in FIGS. 4(a) to 4(f) for example, formed in a long laminate form (see FIG. 4(a)) and the solid electrolyte removed parts 20 are formed on the first solid electrolyte layer 2 of the first laminate 101 (see FIG. 4(b)).

Second Embodiment

Next, the production method of the disclosed embodiments will be described in detail, with reference to the embodiment described in the above (1-2) (FIGS. 2(a) to 2(e)).

A-2. Preparing Step

First, the step of preparing the second laminate 102 (the electrode current collector 4-the first active material layer 1—the first solid electrolyte layer 2-the counter electrode-side active material layer 3) is carried out, in which, as shown in FIG. 2(a), the first active material layer 1 is laminated on the electrode current collector 4; the first solid electrolyte layer 2 is laminated on the first active material layer 1; and the counter electrode-side active material layer 3 is laminated on one side of the first solid electrolyte layer 2, which is opposite to the side on which the first active material layer 1 is laminated.

The formation of the first active material layer 1 and the first solid electrolyte layer 2 can be carried out in the same manner as the embodiment described in the above (1-1) with reference to FIG. 1(a).

In the example shown in FIG. 2(a), the counter electrode-side active material layer 3 is formed to ensure that the length in the longitudinal direction is shorter than the length in the longitudinal direction of the first active material layer 1, and the counter electrode-side active material layer 3 is laminated to ensure that the whole layer is formed within the range of the area in which the first solid electrolyte layer 2 is formed.

Except for the above points, the formation of the counter electrode-side active material layer 3 can be carried out in the same manner as the embodiment described in the above (1-1) with reference to FIG. 1(f).

Figure 2:
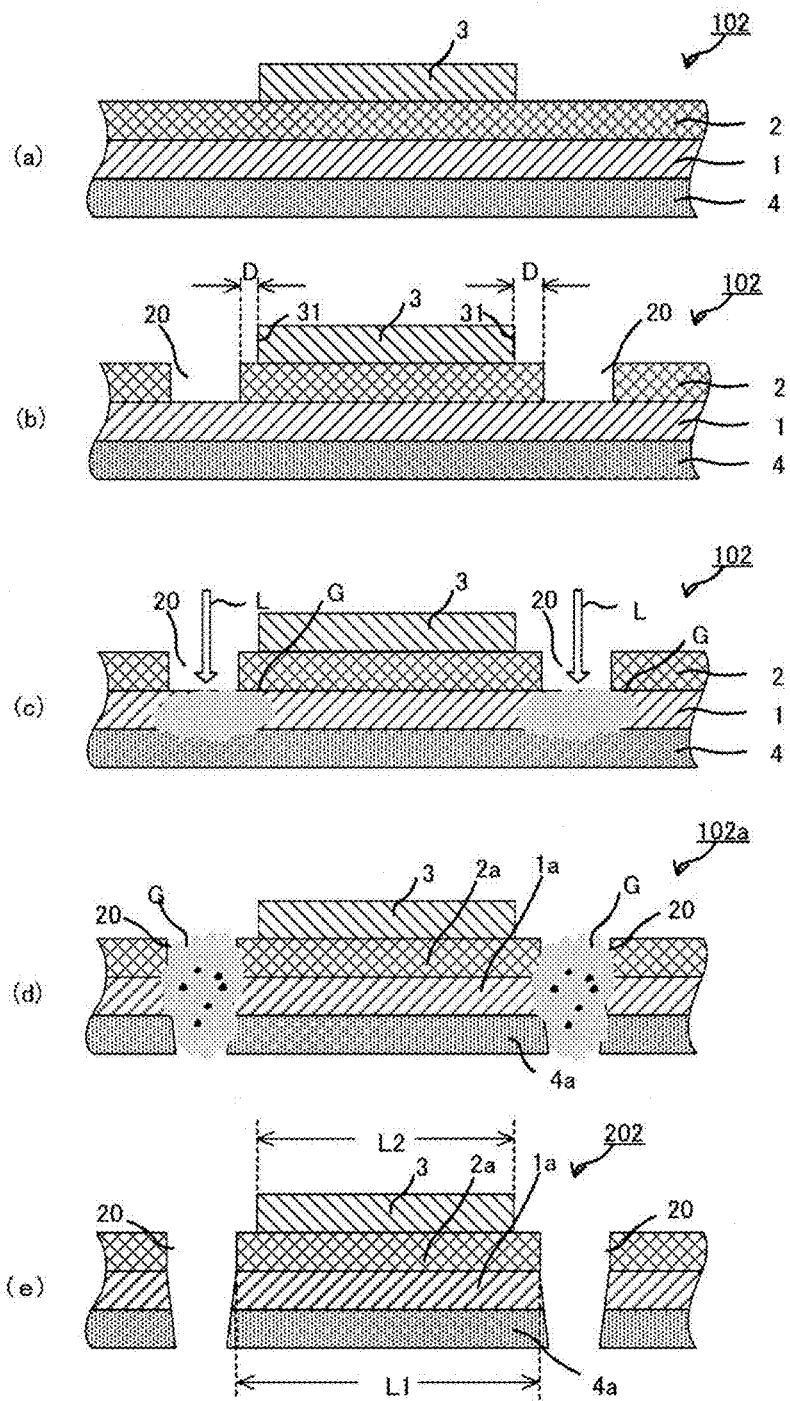
FIG. 2 shows schematic sectional views showing the steps of the all-solid-state battery production method of the disclosed embodiments.

In the example shown in FIG. 2, at least the counter electrode-side active material layer 3 is needed to fulfill the above-described condition. The length in the longitudinal direction of the first active material layer 1 may be the same as or longer than the length in the longitudinal direction of the first solid electrolyte layer 2. Also in the example shown in FIG. 2, the length in the longitudinal direction of the first active material layer 1 may be shorter than the length in the longitudinal direction of the first solid electrolyte layer 2, as long as it fulfills such a condition that it is longer than the length in the longitudinal direction of the counter electrode-side active material layer 3.

B-2. Solid Electrolyte Removed Part Forming Step

Next, the step of forming the solid electrolyte removed part 20 by removing a part of the first solid electrolyte layer 2 on the first active material layer 1, is carried out (see FIG. 2(b)). In the example shown in FIG. 2(b), in which the length in the longitudinal direction of the counter electrode-side active material layer 3 is shorter than the length in the longitudinal direction of the first active material layer 1, the solid electrolyte removed part 20 can be formed in a position close to an end 31 of the counter electrode-side active material layer 3.

The distance D from the end 31 of the counter electrode-side active material layer 3 to the solid electrolyte removed part 20 may be 100 μm or more. Accordingly, the second laminate 102 can be cut to ensure that in the all-solid-state battery 202 obtained after the below-described cutting step, the whole counter electrode-side active material layer 3 is formed within the range of the area in which the first solid electrolyte layer 2a is formed.

On the other hand, the distance D from the end 31 of the counter electrode-side active material layer 3 to the solid electrolyte removed part 20 may be 1000 μm or less. Accordingly, the loss of the first active material layer 1 can be suppressed.

Except for the above points, the step of forming the solid electrolyte layer removed part can be carried out in the same manner as the solid electrolyte layer removed part forming step described in the above (1-1) with reference to FIG. 1(a).

C-2. Cutting Step

Next, as shown in FIGS. 2(c) and (d), the step of cutting the second laminate 102 by applying the laser light L, in the laminating direction of the second laminate 102, to the position of the solid electrolyte removed part 20 from the first solid electrolyte layer 2 side, is carried out.

As a result, the second intermediate laminate 102a (the electrode current collector 4a—the first active material layer 1a—the first solid electrolyte layer 2a—the counter electrode-side active material layer 3) is obtained, in which the first solid electrolyte layer 2a subjected to the cutting step is laminated on the first active material layer 1a subjected to the cutting step, and the counter electrode-side active material layer 3 is laminated on one side of the first solid electrolyte layer 2a subjected to the cutting step, which is opposite to the side on which the first active material layer 1a is laminated (see FIG. 2(d)). Then, an additional step is carried out (such as further laminating a counter electrode-side current collector), thereby obtaining the all-solid-state battery 202 (see FIG. 2(e)).

In the cutting step, the laser light L applied to the second laminate 102 passes through the solid electrolyte removed part 20 and is absorbed into the first active material layer 1 (see FIG. 2(c)). The constituent materials of the first active material layer 1 are evaporated by the energy of the absorbed laser light, thereby cutting the first active material layer 1 (see FIG. 2(d)). The ejected gas G is generated by the evaporation of the constituent materials of the first active material layer 1. The ejected gas G passes through the free path formed in the solid electrolyte removed part 20 of the first solid electrolyte layer 2 and is released to the outside (see FIG. 2(d)). As a result, removal of a part of the first solid electrolyte layer 2 can be suppressed at the time of cutting the second laminate 102. Accordingly, the second laminate 102 can be cut without expanding the removed area of the first solid electrolyte layer 2 larger than the previously-formed solid electrolyte removed part 20.

Accordingly, at the time of applying laser to the second laminate 102, as shown in FIG. 2(c), even when the laser light L is applied to a position close to the end 31 of the counter electrode-side active material layer 3, expansion of the removed area of the first solid electrolyte layer 2 to the interface between the solid electrolyte layer 2 and the counter electrode-side active material layer 3, can be suppressed. That is, the all-solid-state battery 202 obtained after the cutting step, can be an all-solid-state battery in which the whole counter electrode-side active material layer 3 is formed within the range of the area in which the first solid electrolyte layer 2a is formed.

Accordingly, insulation between the first active material layer 1a and counter electrode-side active material layer 3 of the all-solid-state battery 202 can be ensured, without increasing the loss of the first active material layer 1.

The above-described embodiment shown in FIGS. 2(a) to 2(e) may be carried out in the order shown in FIGS. 6(a) to 6(e).

That is, the embodiment shown in FIGS. 2(a) to 2(e) shows an example in which the step of forming the solid electrolyte removed part 20 is carried out after the counter electrode-side active material layer 3 is laminated on the first solid electrolyte layer 2 (see FIGS. 2(a) to (b)). Meanwhile, as shown in FIGS. 6(a) to 6(e), the counter electrode-side active material layer 3 may be laminated in an area between the solid electrolyte removed parts 20, after the step of forming the solid electrolyte removed part 20 is carried out.

FIGS. 5(a) to 5(e) show a variation of the embodiment described in the above (2-1) (FIGS. 2(a) to 2(e)).

In the example shown in FIGS. 5(a) to 5(e), first, the laminate 103 is formed, in which the first solid electrolyte layer 2, the first active material layer 1, the electrode current. collector 4, the second active material layer 1' and the second solid electrolyte layer 2' are laminated in this order. Then, a fourth laminate 104 (the counter electrode-side active material layer 3-the first solid electrolyte layer 2—the first active material layer 1-the electrode current collector 4—the second active material layer 1'—the second solid electrolyte layer 2'—the counter electrode-side active material layer 3') is prepared, in which the counter electrode-side active material layers 3 and 3' are laminated on the first solid electrolyte layer 2 and second solid electrolyte layer 2' of the laminate 103, respectively (see FIG. 5(a)).

On the fourth laminate 104, the step of forming the laminate 103 can be carried out in the same manner as the step described in the above (1-1) with reference to FIG. 3(a).

Figure 5:
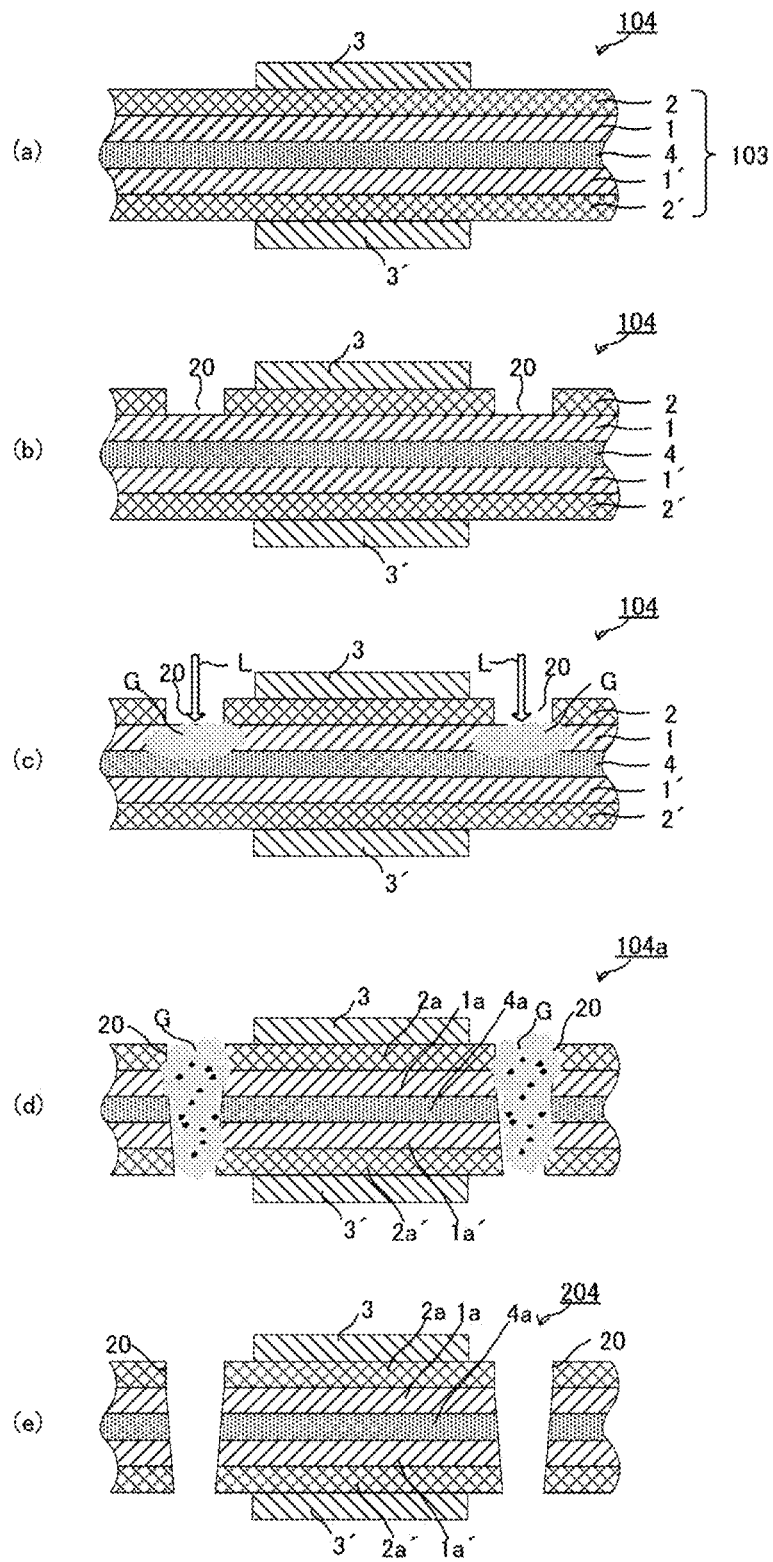
FIG. 5 shows schematic sectional views showing the steps of the all-solid-state battery production method of the disclosed embodiments.
Figure 6:
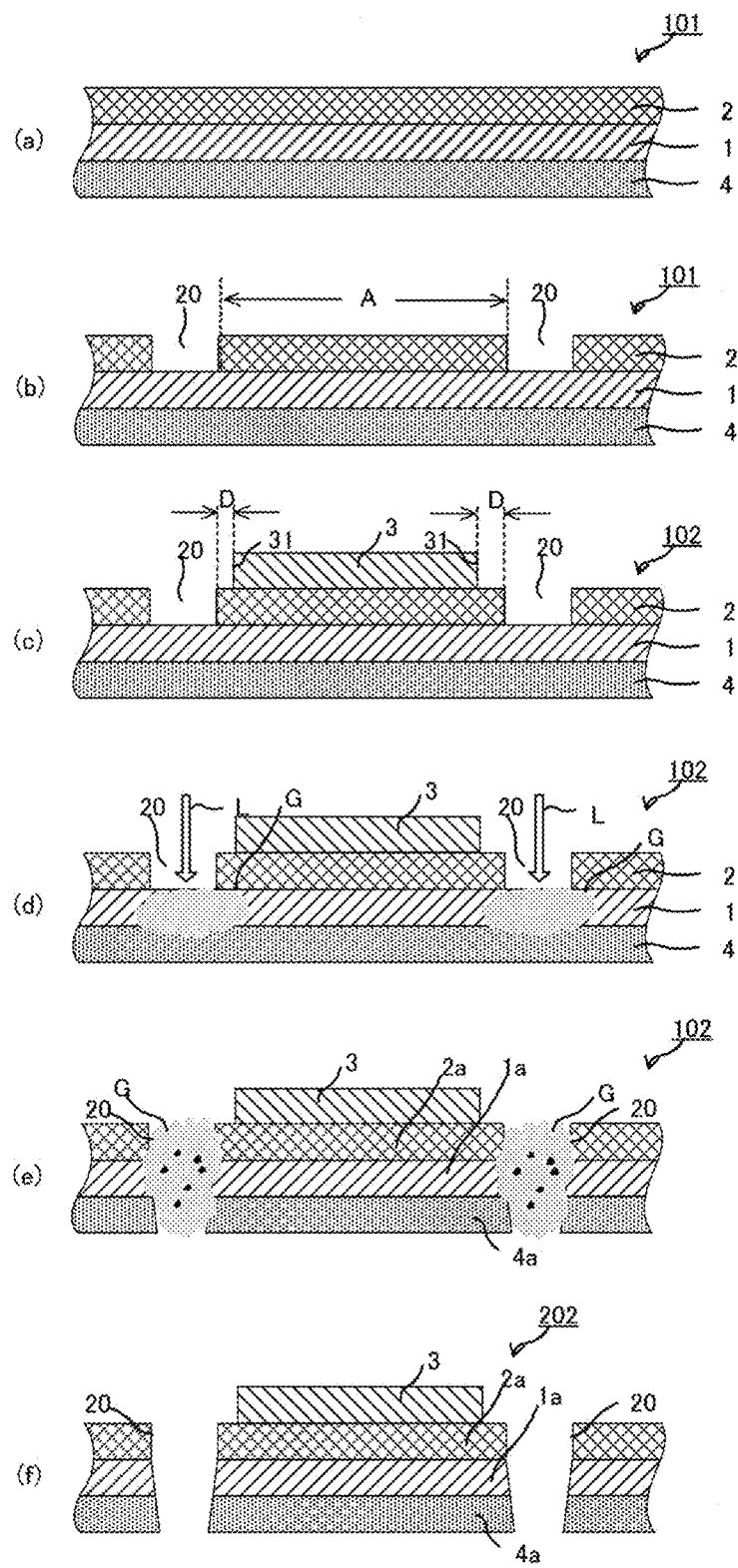
FIG. 6 shows schematic sectional Views showing the steps of the all-solid-state battery production method of the disclosed embodiments.

In the example shown in FIG. 5(a), the counter electrode-side active material layer 3 is formed to ensure that the length in the longitudinal direction is shorter than the length in the longitudinal direction of the first active material layer 1, and the counter electrode-side active material layer 3 is laminated to ensure that the whole layer is formed within the range of the area in which the first solid electrolyte layer 2 is formed. Also in the example shown in FIG. 5(a), the counter electrode-side active material layer 3' is formed to ensure that the length in the longitudinal direction is shorter than the length in the longitudinal direction of the second active material layer 1', and the counter electrode-side active material layer 3' is laminated to ensure that the whole layer is formed within the range of the area in which the second solid electrolyte layer 2' is formed.

Next, as shown in FIG. 5(b), the step of forming the solid electrolyte removed part by removing a part of the first solid electrolyte layer on the first active material layer, is carried out.

The step of forming the solid electrolyte removed part can be carried out in the same manner as the solid electrolyte removed part forming step described with reference to FIG. 2(b).

In the step of forming the solid electrolyte removed part, a solid electrolyte removed part (not shown) may be formed by removing a part of the second solid electrolyte layer 2' on the second active material layer 1'.

Next, as shown in FIGS. 5(c) and (d), the step of cutting the fourth laminate 104 by applying the laser light L, in the laminating direction of the fourth laminate 104, to the solid electrolyte removed part 20 from the first solid electrolyte layer 2 side, is carried out.

In the cutting step shown in FIGS. 5(c) and (d), the laser light L applied to the fourth laminate 104 is absorbed into not only the first active material layer 1, but also at least the electrode current collector 4 and the second active material layer 1'. The ejected gas G is generated by the evaporation of the constituent materials of the first active material layer 1, the electrode current collector 4 and the second active material layer 1'. The ejected gas G passes through the free path formed in the solid electrolyte removed part. 20 and the cut part of the first active material layer 1 and the electrode current collector 4, and it is released to the outside (see FIG. 5(d)). As a result, a fourth intermediate laminate 104a (the counter electrode-side active material layer 3—the first solid electrolyte layer 2a—the first active material layer 1a—the electrode current collector 4a—the second active material layer 1a'—the second solid electrolyte layer 2a'—the counter electrode-side active material layer 3') is obtained, in which the counter electrode-side active material layer 3, the first solid electrolyte layer 2a subjected to the cutting step, the first active material layer 1a subjected to the cutting step, the electrode current collector 4a subjected to the cutting step, the second active material layer 1a' subjected to the cutting step, the second solid electrolyte layer 2a' subjected to the cutting step, and the counter electrode-side active material layer 3' are laminated in this order (see FIG. 5(d)). Then, an additional step is carried out (such as further laminating a counter electrode-side current collector), thereby obtaining an all-solid-state battery 204 (see FIG. 5(e)).

As described above, in the production method of the disclosed embodiments shown in FIGS. 5(a) to 5(e), the solid electrolyte removed part 20 is formed in the first solid electrolyte layer 2, and the laser light L is applied to the solid electrolyte removed part 20. Accordingly, at the time of cutting the fourth laminate 104, removal of a part of the first solid electrolyte layer 2 can be suppressed.

Accordingly, for the same reason as described above relating to the embodiment shown in FIGS. 2(a) to 2(e), insulation between the first active material layer 1a and counter electrode-side active material layer 3 of the thus-obtained all-solid-state battery 204 and insulation between the second active material layer 1a' and counter electrode-side active material layer 3' of the thus-obtained all-solid-state battery 204 can be ensured, without increasing the loss of the first active material layer 1.

Figure 7:
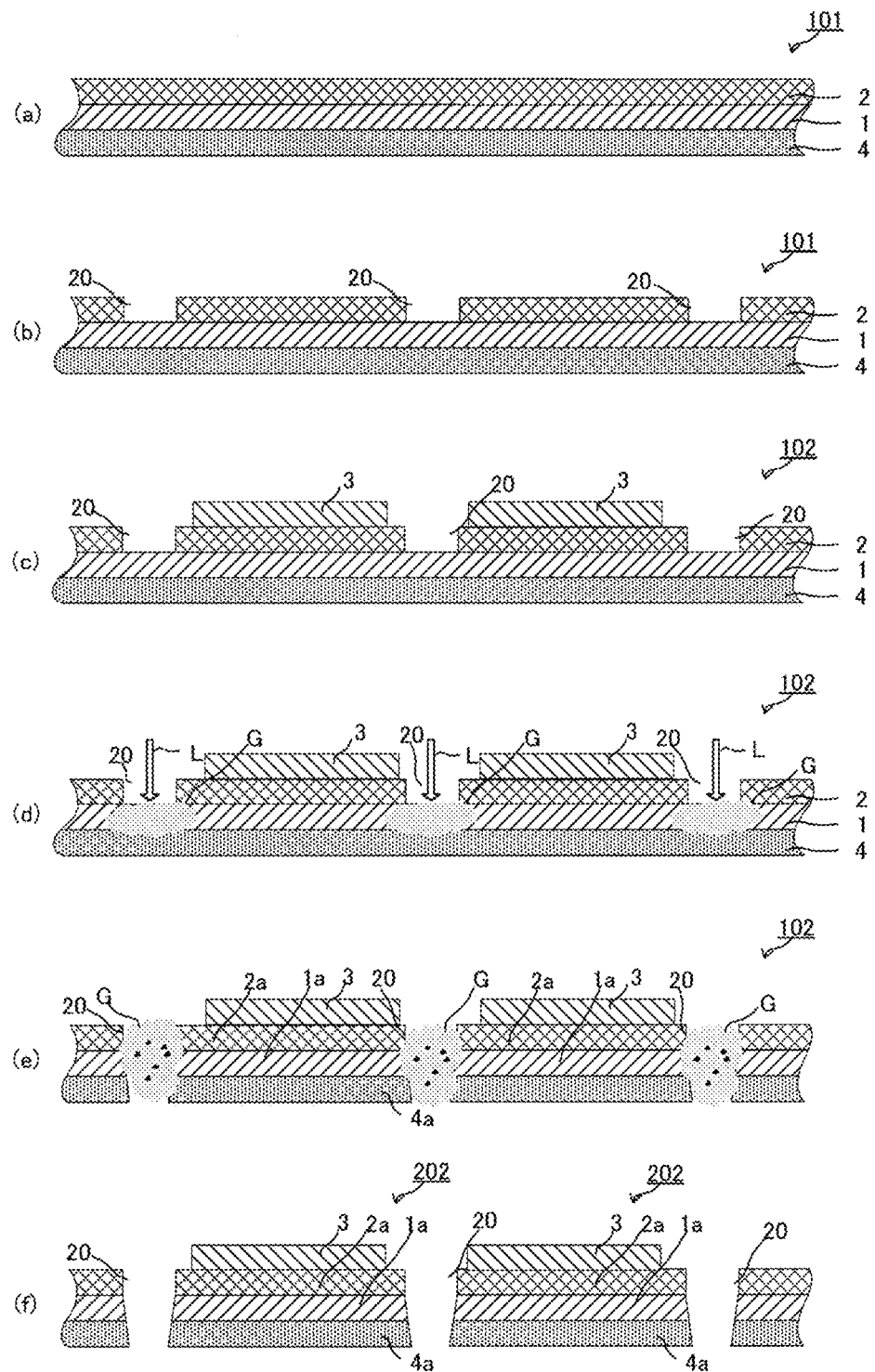
FIG. 7 shows schematic sectional views showing the steps of the all-solid-state battery production method of the disclosed embodiments.

On the embodiment shown in FIGS. 6(a) to 6(f), the steps shown in FIGS. 7(c) to 7(f) may be carried out in the same manner as the steps shown in FIGS. 6(c) to 6(f), after the first laminate 101 (the electrode current collector 4—the first active material layer 1—the first solid electrolyte layer 2) is, as shown in FIGS. 7(a) to 7(f) for example, formed in a long laminate form (see FIG. 7(a)) and the solid electrolyte removed parts 20 are formed on the first solid electrolyte layer 2 of the first laminate 101 (see FIG. 7(b)).

As described above, the first intermediate laminate 101a, the second intermediate laminate 102a, the third intermediate laminate 103a and the fourth intermediate laminate 104a, are obtained by cutting the first laminate 101, the second laminate 102, the third laminate 103 and the fourth laminate 104, respectively. For each intermediate laminate, when the cut end of the first active material layer 1a protrudes to more outside than the cut end of the first solid electrolyte layer 2a, or when the cut end of the second active material layer 1a' remains more outside than the cut end of the second solid electrolyte layer 2a', the protruding end of the first active material layer 1a or that of the second active material layer 1a' may be removed by laser application or by use of a cutting blade.

2. All-Solid-State Battery

Each of the all-solid-state batteries 201 and 202 comprises the electrode current collector 4a, the first active material layer 1a, the first solid electrolyte layer 2a and the counter electrode-side active material layer 3, which are arranged in this order and attached to each other directly or via a component composed of a different material, and the counter electrode-side current collector laminated on the laminate. Each of the all-solid-state batteries 203 and 204 comprises the counter electrode-side active material layer 3, the first solid electrolyte layer 2a, the first active material layer 1a, the electrode current collector 4a, the second active material layer 1a', the second solid electrolyte layer 2a' and the counter electrode-side active material layer 3', which are arranged in this order and attached to each other directly or via a component composed of a different material, and the counter electrode-side current collector laminated on the laminate.

For the laminate of the electrode current collector-the first active material layer-the first solid electrolyte layer—the counter electrode-side active material layer, the thickness of each of the first active material layer and the counter electrode-side active material layer is generally about 0.1 μm or more and about 200μm or less, and the thickness of the first solid electrolyte layer is generally about 0.1 μm or more and about 300 μm or less.

For the laminate of the counter electrode-side active material layer-the first solid electrolyte layer-the first active material layer-the electrode current collector-the second active material layer-the second solid electrolyte layer-the counter electrode-side active material layer, the thickness of each of the first active material layer, the second active material layer and the counter electrode-side active material layer is generally about 0.1 μm or more and about 200 μm or less, and the thickness of each of the first solid electrolyte layer and the second solid electrolyte layer is generally about 0.1 μm or more and 300 μm or less.

Other components (such as a housing) may be attached to the all-solid-state batteries 201 to 204.

EXAMPLES

Hereinafter, the disclosed embodiments will be further clarified by the following examples. The disclosed embodiments are not limited to the following examples, however.

1. Production of Laminate

Production Example 1

(1) Anode Active Material Layer Forming Step

The following raw materials for forming an anode were put in a polypropylene container.

Anode active material particles: Single-crystal Si (manufactured by Kojundo Chemical Laboratory Co., Ltd., average particle diameter 5 μm), 2.0 g Sulfide-based solid electrolyte: $Li_2S$—$P_2S_5$-based glass ceramic particles containing LiI (average particle diameter 1.5 μm), 1.5 g Binder: 10 Mass % solution of a PVdF-based binder in butyl butyrate, 0.4 g Dispersion medium: Butyl butyrate, 2.1 g Conductive additive: VGCF, 0.1 g The mixture in the container was stirred for 30 seconds by an ultrasonic oscillator ("UH-50" manufactured by SMT Co., Ltd.) Next, the container was shaken for 30 minutes by a shaking device ("TTM-1" manufactured by Sibata Scientific Technology Ltd.), thereby preparing an anode mixture.

Using an applicator, the anode mixture was applied to one surface of a copper foil (an anode current collector, manufactured by UACJ Foil Corporation) by a blade method, thereby forming an anode mixture layer. Next, the anode mixture layer was dried on a hot plate at 100° C. for 30 minutes to form an anode active material layer.

(2) Solid Electrolyte Layer Forming Step

The following raw materials for forming a solid electrolyte layer were put in a polypropylene container.

Sulfide-based solid electrolyte: $Li_2S$—$P_2S_5$-based glass ceramic particles containing LiI (average particle diameter 2.0 μm), 1 g Binder: 5 Mass % solution of a PVdF-based binder in butyl butyrate, 0.1 g Dispersion medium: Butyl butyrate, 1.5 g The mixture in the container was stirred for 30 seconds by the ultrasonic oscillator ("UH-50" manufactured by SMT Co., Ltd.) Next, the container was shaken for 30 minutes by the shaking device ("TTM-1" manufactured by Sibata Scientific Technology Ltd.), thereby preparing a composition for forming a solid electrolyte layer.

Using an applicator, the composition was applied on a removable sheet (an Al foil) by the blade method, thereby forming a solid electrolyte layer. The solid electrolyte layer was dried on the hot plate at 100° C. for 30 minutes.

As a result, a laminate of the solid electrolyte layer and the removable sheet (the Al foil) was obtained by the solid electrolyte layer forming step. Also, a laminate of the copper foil (the anode current collector) and the anode active material layer was obtained by the anode active material layer forming step. The laminates were stacked to ensure that the solid electrolyte layer-side surface of the laminate of the solid electrolyte layer and the removable sheet (the Al foil) faced the anode active material layer-side surface of the laminate of the copper foil (the anode current collector) and the anode active material layer. The removable sheet (the Al foil) was removed from the solid electrolyte layer, thereby transferring the solid electrolyte layer onto the anode active material layer. As a result, a laminate 1 (the anode current collector (the copper foil)—the anode active material layer-the solid electrolyte layer) was obtained.

2. Cutting of Laminate

Example 1

Laser light of a wavelength of 1 μm was applied to the surface of the solid electrolyte layer of the laminate 1, at an intensity of 1200 W/cm$^2$ for $4 \times 10^{-5}$ seconds, thereby forming a solid electrolyte removed part. The width of the solid electrolyte removed part was 0.39 mm.

Next, in the laminating direction of the laminate 1, laser light of a wavelength of 1 μm was applied to the solid electrolyte removed part, at an intensity of 6000 W/cm$^2$ for $1.3 \times 10^{-5}$ seconds, thereby cutting the laminate 1.

Comparative Example 1

A laminate 1' was produced in the same manner as Production Example 1. In the laminating direction of the laminate 1', laser light was applied to the laminate 1' from the solid electrolyte layer side, thereby cutting the laminate 1'. The laser light application was carried out in the same condition as Example 1. In Comparative Example 1, the formation of the solid electrolyte removed part was not carried out.

3. Evaluation (1) Observation of Laminate Subjected to Cutting

Figure 11:
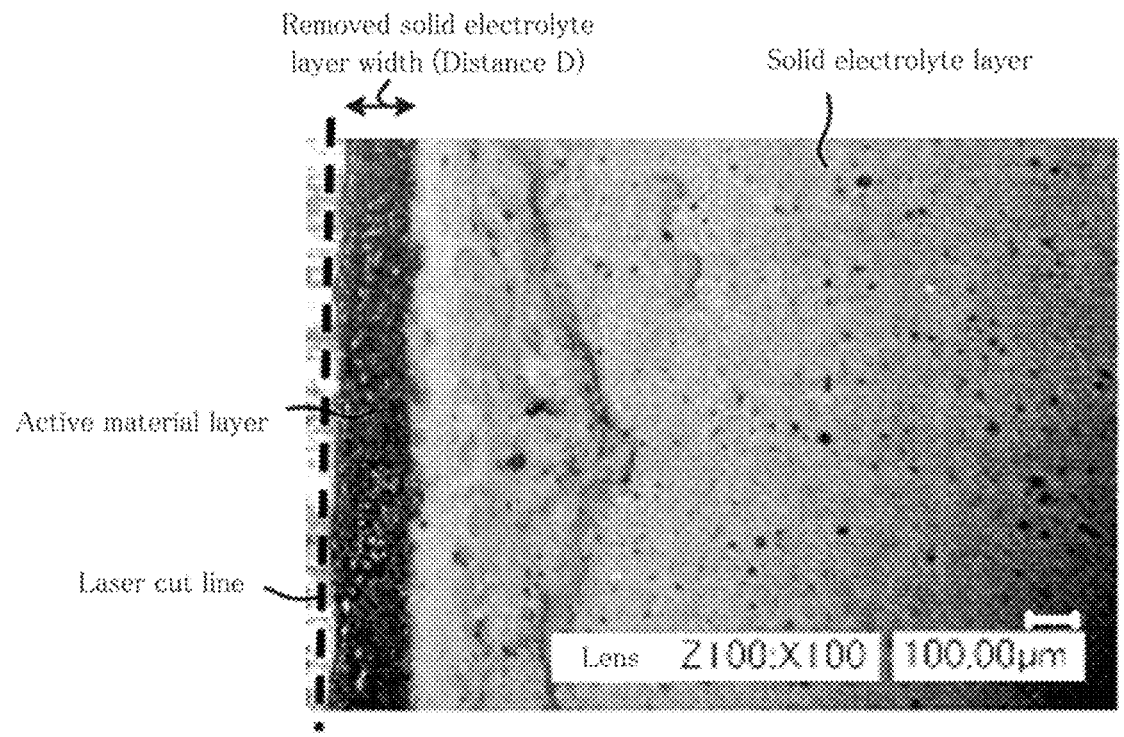
FIG. 11 is an image obtained by SEM observation of the solid electrolyte layer-side surface of a laminate 1 cut by laser application in Example 1.

SEM observation was carried out on the solid electrolyte layer-side surface of the laminate 1 of Example 1 and that of the laminate 1' of Comparative Example 1, both of which were subjected to the cutting by the laser application. Images obtained by the SEM observation are shown in FIGS. 11 and 12.

4. Conclusion

Figure 12:
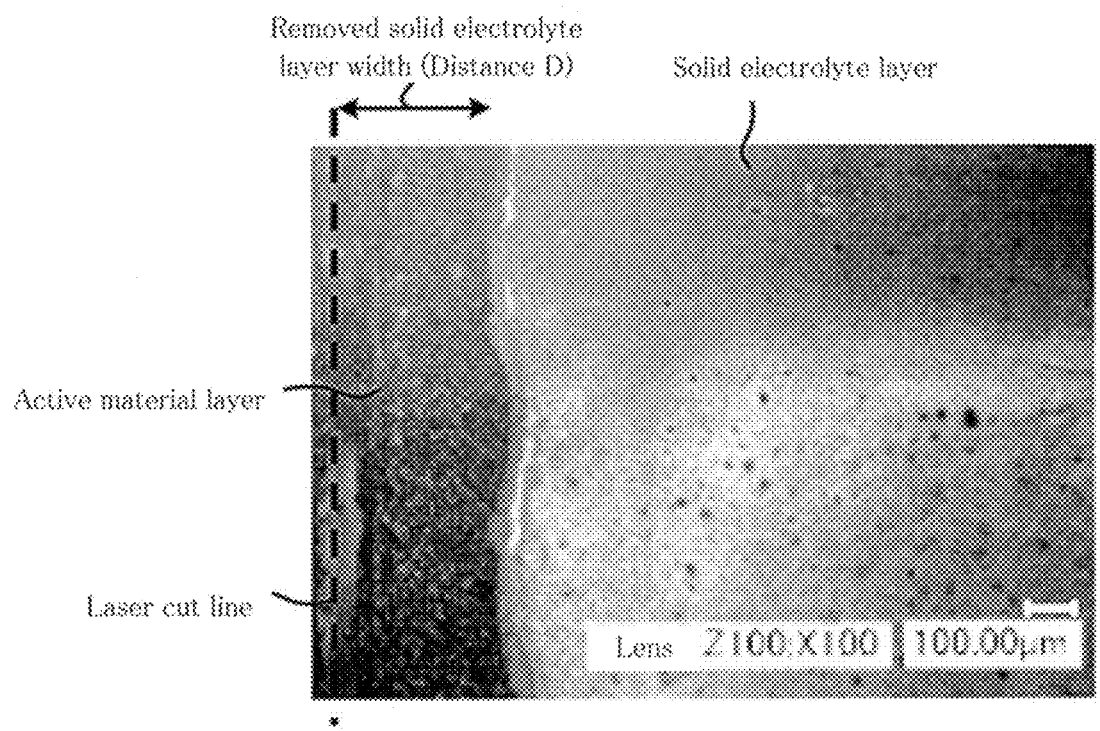
FIG. 12 is an image obtained by SEM observation of the solid electrolyte layer-side surface of a laminate 1' cut by laser application in Comparative Example 1.

For Comparative Example 1 in which the cutting by the laser application was carried out without forming the solid electrolyte removed part, as shown in FIG. 12, removal of the solid electrolyte layer occurred on the laminate 1' subjected to the cutting. In FIG. 12, the removed solid electrolyte layer width that is the width of an area from the cut end produced by the laser application to the end of the solid electrolyte layer (that is, the distance D from the cut end produced by the laser application to the end of the solid electrolyte layer) was about 0.37 mm.

In Example 1, as described above, the solid electrolyte removed part with a width of 0.39 mm was formed before the step of cutting the laminate, and the laminate 1 was cut by applying the laser light to the solid electrolyte removed part. In Example 1, as shown in FIG. 11, it was able to cut the laminate 1 without increasing the removal of the first solid electrolyte layer larger than the previously-formed solid electrolyte removed part of the laminate 1 subjected to the cutting. More specifically, in. Example 1, as shown in FIG. 11, on the laminate 1 subjected to the cutting, the removed solid electrolyte layer width that is the width of the area from the cut end produced by the laser application to the end of the solid electrolyte layer (that is, the distance D from the cut end produced by the laser application to the end of the solid electrolyte layer) was 0.17 mm. The removed solid electrolyte layer width (that is, the area indicated by D) shown in FIG. 11 is a part of the area of the solid electrolyte removed part formed before the cutting of the laminate 1.

REFERENCE SIGNS LIST 1, 1a. First active material layer
1', 1a'. Second active material layer
2, 2a. First solid electrolyte layer
2', 2a'. Second solid electrolyte layer
3, 3'. Counter electrode-side active material layer
4, 4a. Electrode current collector
11. Active material layer present beneath a removed area 21
12. Active material layer present beneath an area 21'
20. Solid electrolyte removed part
21. Removed area
21'. Area in which the solid electrolyte is expected to be removed
31. End of the counter electrode-side active material layer 3
32. Cut part margin
101. First laminate
101a. First intermediate laminate
102. Second laminate
102a. Second intermediate laminate
103. Third laminate
103a. Third intermediate laminate
104. Fourth laminate
104a. Fourth intermediate laminate
106, 106a, 107. Laminate
201. to 204. All-solid-state battery D. Distance from the end 31 of the counter electrode-side active material layer 3 to the solid electrolyte removed part 20
101E. Cut end
G. Ejected gas
L. Laser light
L1. Length in the longitudinal direction of the first active material layer 1a
L2. Length in the longitudinal direction of the counter electrode-side active material layer 3
L3. Length in the longitudinal direction of the second active material layer 1a'
L4. Length in the longitudinal direction of the counter electrode-side active material layer 3'

The invention claimed is:

1. A method for producing an all-solid-state battery, the method comprising:
preparing a first laminate by laminating a first solid electrolyte layer on a first active material layer,
forming a solid electrolyte removed part by removing a part of the first solid electrolyte layer on the first active material layer by at least one of a first removal process, a second removal process, or a third removal process, and
after forming the solid electrolyte removed part, cutting the first laminate by applying laser light at a cutting wavelength, a cutting intensity, and a cutting time period, in a laminating direction of the first laminate, to the solid electrolyte removed part, wherein the cutting wavelength is 1 μm, the cutting intensity is 6000 W/cm$^2$, and the cutting time period is $1.3 \times 10^{-5}$ seconds,
wherein the first removal process comprises:
applying laser light at a removal wavelength, a removal intensity, and a removal time period, wherein the removal wavelength is 1 μm, the removal intensity is 1200 W/cm$^2$, and the removal time period is $4 \times 10^{-5}$ seconds;
the second removal process comprises:
applying heat to a portion of the solid electrolyte material using a heater;
the third removal process comprises:
mechanically cutting to a portion of the solid electrolyte material using a cutting blade.

2. The method for producing the all-solid-state battery according to claim 1,
wherein the method further comprises, before the cutting, preparing a second laminate by laminating a counter electrode-side active material layer on one side of the first solid electrolyte layer, which is opposite to the side on which the first active material layer is laminated, and
wherein the cutting is cutting the second laminate by applying laser light, in a laminating direction of the second laminate, to the solid electrolyte removed part.

3. The method for producing the all-solid-state battery according to claim 1,
wherein a third laminate in which the first solid electrolyte layer, the first active material layer, an electrode current collector, a second active material layer and a second solid electrolyte layer are laminated in this order, is prepared as the first laminate, and
wherein, in the cutting, the third laminate is cut by applying laser light, in a laminating direction of the third laminate, to the solid electrolyte removed part.

4. The method for producing the all-solid-state battery according to claim 1, wherein the solid electrolyte removed part is formed by the first removal process.

5. The method for producing the all-solid-state battery according to claim 4,
wherein the removal wavelength is controlled to be lower than the cutting wavelength.

6. The method for producing the all-solid-state battery according to claim 4,
wherein the removal intensity is controlled to be lower than the cutting intensity.

7. The method for producing the all-solid-state battery according to claim 1,
wherein the solid electrolyte removed part is formed by the second removal process.

8. The method for producing the all-solid-state battery according to claim 1,
wherein the solid electrolyte removed part is formed by the third removal process.

\* \* \* \* \*